United States Patent [19]

Breeden et al.

[11] Patent Number: 5,072,444
[45] Date of Patent: Dec. 10, 1991

[54] CENTRAL CONTROLLER WITH ADAPTIVE MESSAGE HANDLING CHARACTERISTICS

[75] Inventors: Robert L. Breeden; Prabbakar Muppidi, both of Boynton Beach, Fla.

[73] Assignee: Motorola, Inc., Schaumburg, Ill.

[21] Appl. No.: 425,889

[22] Filed: Oct. 23, 1989

[51] Int. Cl.$^5$ .............................. H04J 3/24; G08B 5/22
[52] U.S. Cl. ............................. 370/94.1; 340/825.44; 370/84; 370/95.1
[58] Field of Search ................. 370/82, 84, 85.7, 94.1, 370/95.1, 110.1; 379/59, 63, 56, 57; 340/825.44, 825.47, 825.48; 455/33, 34, 53, 54, 56

[56] References Cited

U.S. PATENT DOCUMENTS

| | | |
|---|---|---|
| 4,701,943 | 10/1987 | Davis . |
| 4,816,820 | 3/1989 | Davis ............................... 370/84 |
| 4,866,709 | 9/1989 | West et al. ...................... 370/95.1 |

Primary Examiner—Douglas W. Olms
Assistant Examiner—Wellington Chin
Attorney, Agent, or Firm—William E. Koch; Vincent B. Ingrassia; Anthony J. Sarli, Jr.

[57] ABSTRACT

A central controller operating as a pager terminal for receiving, handling, and transmitting messages is shown that adaptively alters its message handling characteristics in order to improve the overall throughput of the central controller. The channel loading characteristics, based upon the time of day, are used in order to vary the limitation of the size of message received by the central controller as well as vary the transmission size and age of messages prior to transmission. Additionally, channel loading may be determined by determining the total size of messages within the central controller. In response to the total size determination, the limitation of the message size received by the controller may be varied. Furthermore, the transmission size and age of messages prior to transmission may be varied in response to the total size determination. The central controller may also adopt these operations in response to the combination of the total size determination and channel loading based upon the time of day characteristics.

35 Claims, 16 Drawing Sheets

— PRIOR ART —

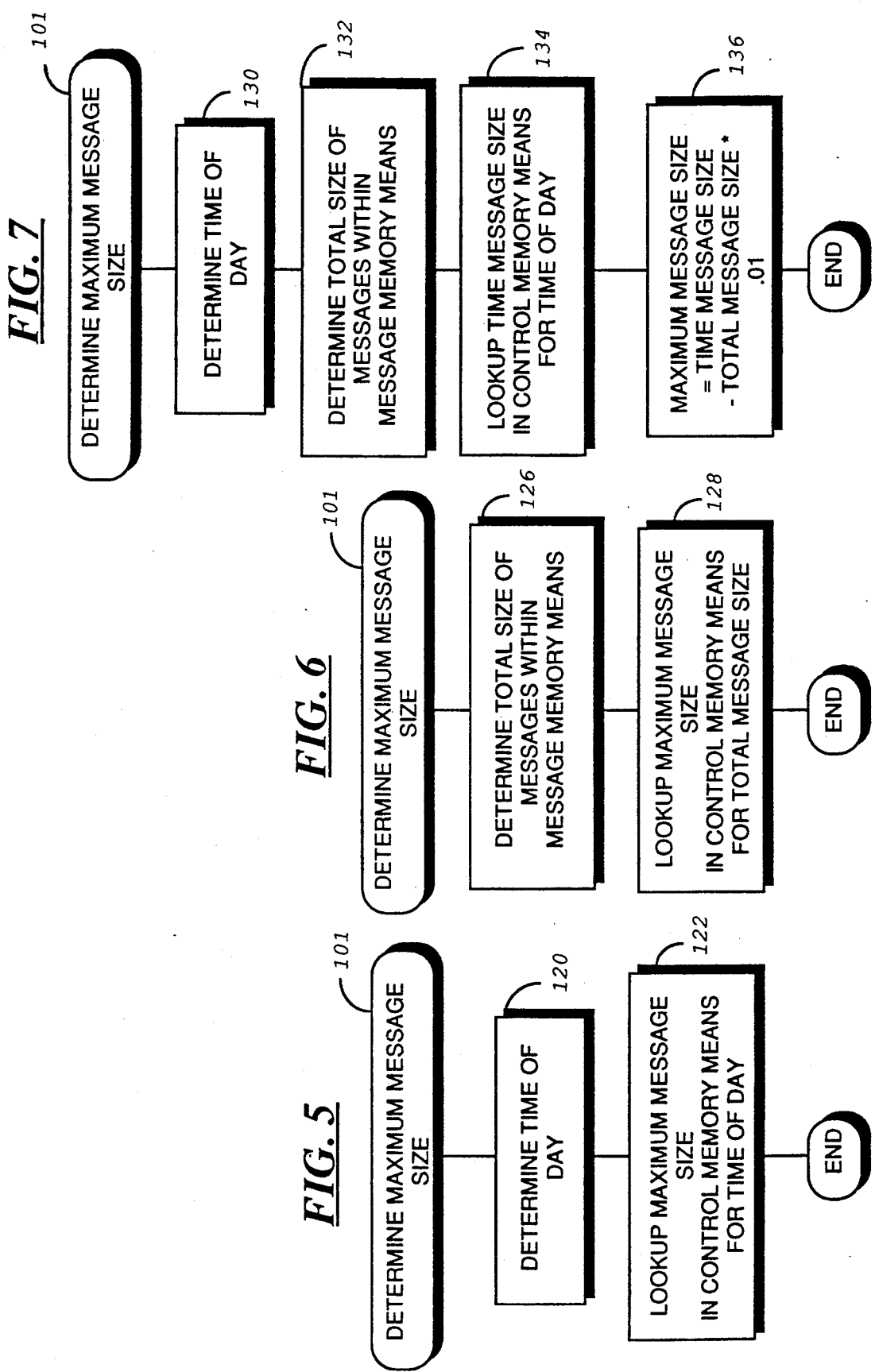

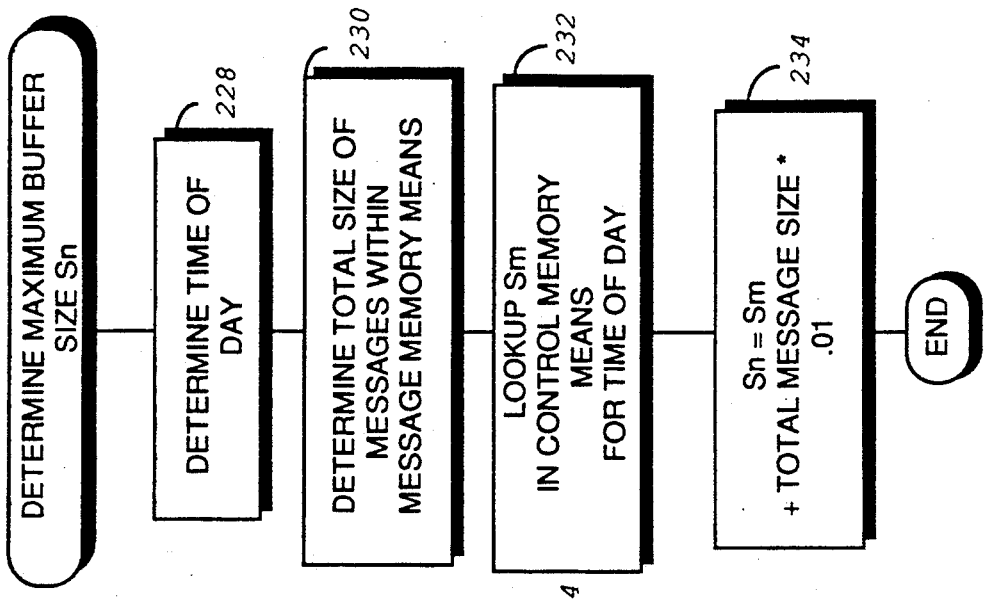
*FIG. 15*
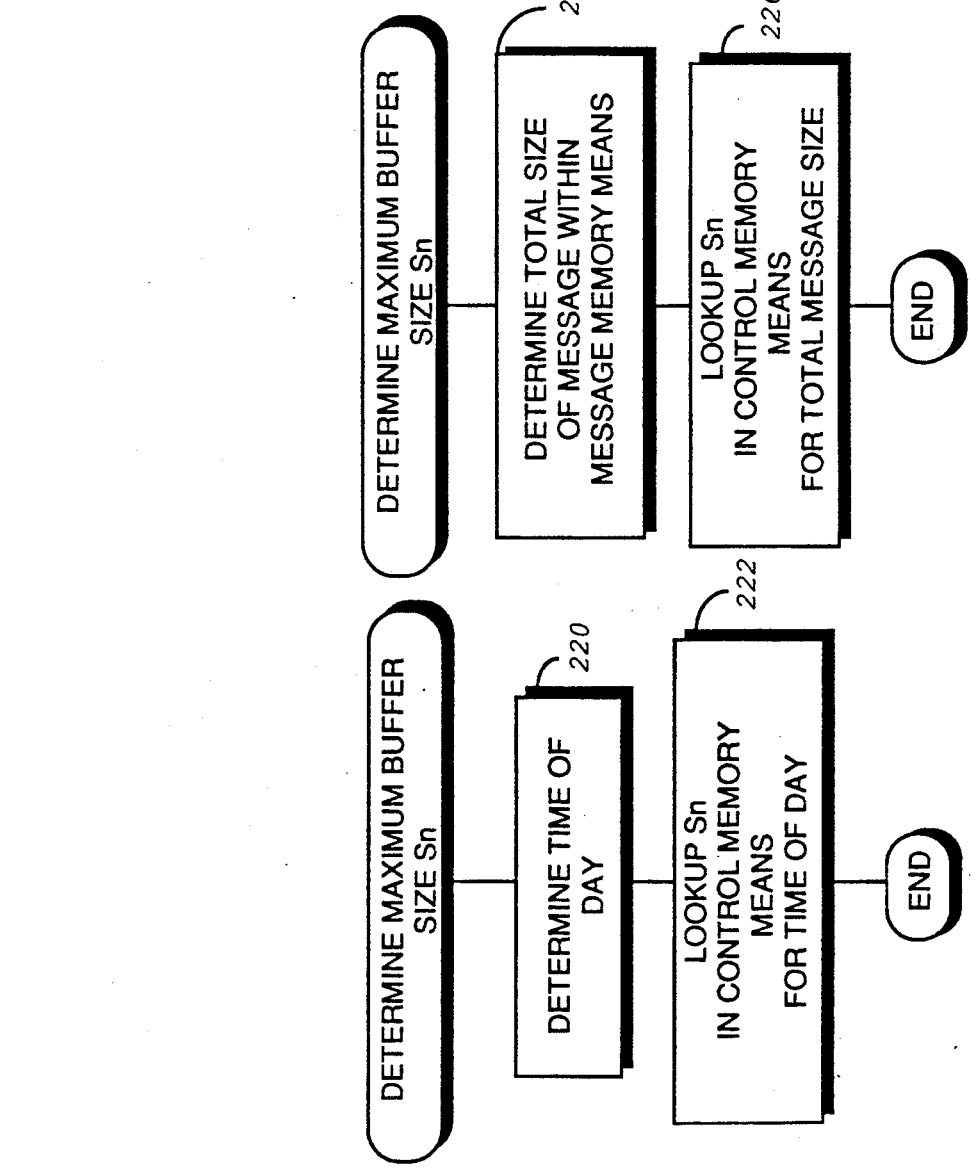
*FIG. 14*
*FIG. 13*

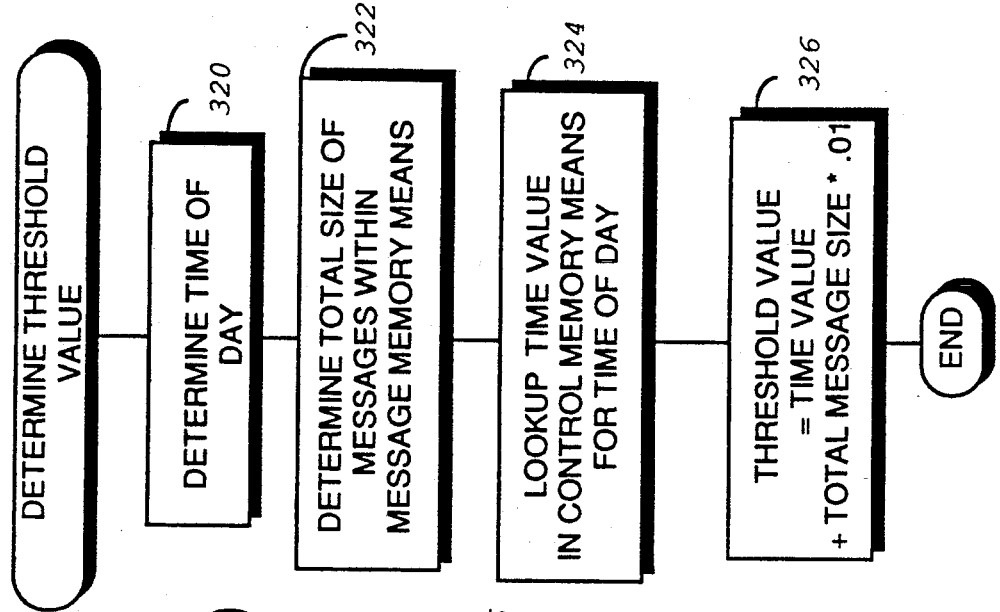
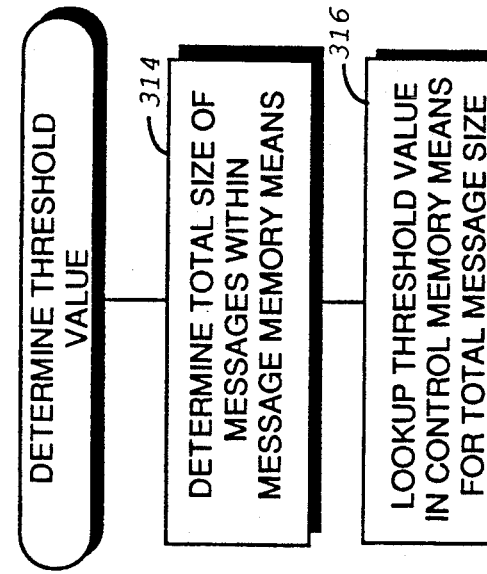
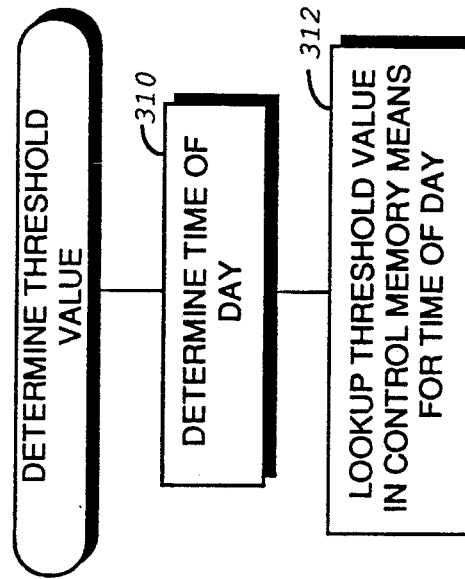

CENTRAL CONTROLLER WITH ADAPTIVE MESSAGE HANDLING CHARACTERISTICS

BACKGROUND OF THE INVENTION

The present invention relates to a central controller for receiving, handling and transmitting messages to a plurality of selective call receivers.

Currently, manufactured central controllers, henceforth referred to as paging terminals, transmit messages on a number of paging transmission protocols. These protocols include the Golay, POCSAG, 5/6 tone, and the two-tone signalling protocols, as well as several others. The operation of these protocols are well known to those familiar with the art. Paging terminals generally receive messages and determine the proper protocol for transmission of each message and then transmits the messages to the selective call receivers. Selective cal receivers include paging devices and henceforth are referred to as pagers.

A number of methods are used in order to receive, handle and transmit the messages to the pagers by the paging terminal. A first method for handling the transmission of the messages is to transmit the messages in the order they are received. Because of the synchronization phenomenon associated with some of the signalling systems, substantial delays are required between the transmission of some protocols. The delays between the transmission of these protocols tends to reduce the overall throughput of the paging terminal, thereby reducing the amount of messages information that can be transmitted on a channel, thus reducing the channel loading.

Other paging terminals accumulate messages into their respective protocols prior to transmission, and then transmit the messages of each protocol. In accumulating messages in this manner, a protocol can be transmitted without interruptions between the messages, thereby reducing the delay between the transmission of messages. Additionally, some protocols, such as Golay and POCSAG, require a preamble be transmitted prior to message transmission. By accumulating messages within their respective protocols, the transmission of preamble signals can be substantially reduced. Paging terminals operating in this manner may use a sequential order for transmitting message protocols. For example, first a Golay protocol will be transmitted followed by a POCSAG protocol and followed by a 5/6 tone protocol and then followed by a two-tone sequential protocol, wherein the terminal then returning back to the first Golay protocol to transmit messages accumulated during the transmission of the other protocols.

An improvement upon this technique has been to accumulate messages within a protocol until a predetermined message size within the protocol is obtained. When the size is obtained, the messages protocol is transmitted. This technique has a disadvantage in that messages may be held for substantially long time waiting for the message protocol to reach a certain size prior to transmission. This sort of message delay is undesirable in the operation of a paging terminal. Consequently, some terminals transmit message protocols even if they have not reached a predetermined size if the message is within the protocol are of a certain age. However, transmission of a protocol before an optimal size is reached decreases the paging terminal's throughput. In order to improve the throughput of the paging terminal, it would be advantageous to provide a means for adjusting the maximum age of a protocol prior to transmission, the maximum age adjustment being based upon the channel loading characteristics.

Additionally, paging terminals receive messages of a certain maximum size, wherein the message is received, handled and transmitted by the paging terminal when it is less than or equal to the maximum size. In order to improve the throughput of the paging terminal, it would be advantageous to provide a means for adjusting the maximum size of the message received by the paging terminal based upon the channel loading characteristics.

Furthermore, paging terminals hold all messages of a protocol to a constant maximum size. It is desirable for some pager users to receive messages larger than the constant maximum size. For this kind of message service, some pager users would be willing to pay a premium. Alternately, some pager users wish to economize on the message service payment and would accept messages smaller than the constant maximum size. Thus, it would be desirable to establish a means for individually determining maximum message size of a message according to each pager user. It would also be desirable to adjust this individual maximum message size based upon the channel loading characteristics.

Additionally, the tariff structure of paging messaging is typically a fixed monthly price independent of the time of day in which a message is transmitted. Thus there is no motivation for users of a paging service to defer messaging to hours of the day where the system were not so heavily loaded. Thus it would be advantageous to provide a billing means which varies the tariff charge for messaging on the basis of the time of the day, wherein the time of day corresponds to system loading.

Channel loading characteristics are predictable based upon the time of day. FIG. 1 shows a prior art illustration of the system loading or channel loading of a typical paging transmission channel. Given these characteristics, it would be desirable to provide a means for adjusting the maximum size of an incoming message by the time of day. Also, it would be desirable to provide adjustment of the maximum size of the messages accumulated within a protocol buffer by the time of day in order to optimize the system throughput. Furthermore, it is desirable to optimize the maximum age of messages accumulated within the protocol buffer by the time of day in order to balance the throughput with the message delay.

An indication of the channel loading also can be found by determining the total message held within the paging terminal. It would also be desirable to increase the throughput of the paging terminal by adjusting the input message size, the maximum size and the maximum age of messages accumulated within a protocol, based upon the total messages held within the paging terminal. Finally, it would be desirable to increase the throughput by adjusting these same parameters as a combination of the total messages within the paging terminal and the time of day.

SUMMARY OF THE INVENTION

It is therefore an object of the present invention to provide a means for adjusting the size of an incoming message by the time of day.

It is another object of this invention to provide means for adjusting the size of an incoming message in response to the total size of a message held within a paging terminal.

It is another object of the present invention to adjust the maximum size of the message transmission of a protocol based upon the time of day.

It is another object of this invention to adjust the maximum size of a protocol transmission based upon the total size of the message held within the paging terminal.

It is another object of this invention to adjust the maximum age of the message held within a protocol prior to transmission based upon the time of day.

It is yet another object of this invention to adjust the maximum age of the message held within a protocol prior to transmission based upon the total size of the messages held within a paging terminal.

It is a further object of the present invention to provide a time of day clock for controlling and modifying operational characteristics within a paging terminal. The operational characteristics may include modifying the maximum size of an incoming message, the tariff charged for messaging, or the maximum size of a protocol transmission.

These and other objects of this invention will become clear as the description proceeds.

BRIEF DESCRIPTION OF HE DRAWINGS

FIG. 5 shows a technique for determining the maximum message size.

FIG. 6 shows an alternate technique for determining the maximum message size.

FIG. 7 shows another alternate technique for determining the maximum message size.

FIG. 13 shows a technique for determining the size of a buffer.

FIG. 14 shows an alternate technique for determining the maximum size of a buffer.

FIG. 15 shows another alternate technique for determining the maximum size of a buffer.

FIG. 25 shows a technique for determining the threshold value of a POCSAG batch.

FIG. 26 shows an alternate technique for determining the threshold, value of a POCSAG batch.

FIG. 27 shows a second alternate technique for determining the threshold value of a POCSAG batch.

DESCRIPTION OF A PREFERRED EMBODIMENT

Figure 1:
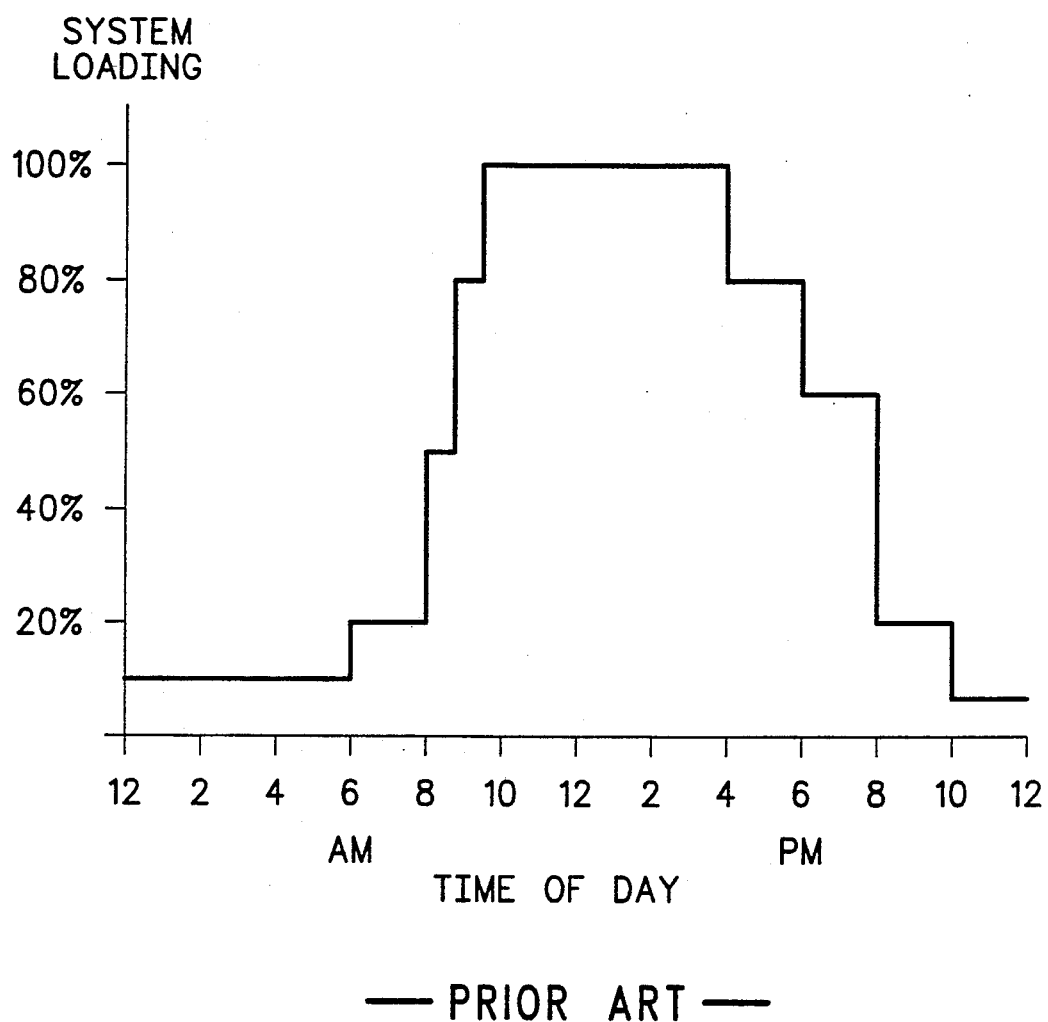
FIG. 1 shows a prior art graphical representation of the system leading for a typical paging channel.

According to the principals of the present invention, the loading for paging systems is dependent upon the time of day because the primary users for pager systems are active during conventional business hours. Other users require their pagers to be active twenty-four hours a day. These users account for most of the system loading during "off hours". The system loading for a typical paging channel is graphically shown in FIG. 1. Early morning hours 12:00 A.M.–6:00 A.M. are usually lightly loaded times. As the day progresses, loading gradually increases until peak loading hours occur between 10:00 A.M.–4:00 P.M. System loading then gradually decreases and the cycle repeats. System loading is detailed in the U.S. Pat. No. 4,701,943 entitled "Paging System Using LPC Speech Including with an Adaptive Bit Rate" issued to Walter Davis et al. which is hereby incorporated by reference.

Figure 2:
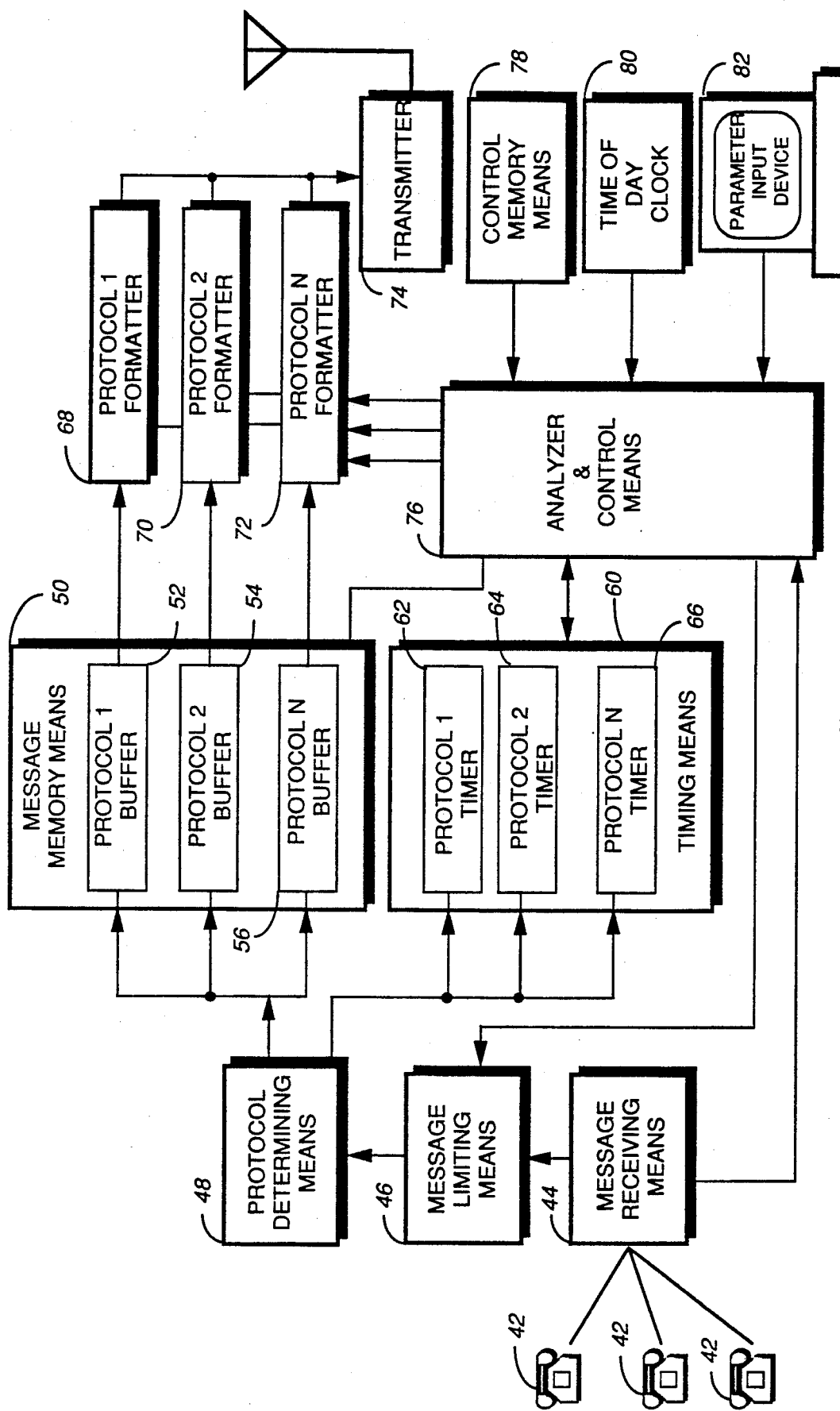
FIG. 2 shows a block diagram of the central controller of the present invention.

FIG. 2 shows a block diagram of the central controller of the present invention. The central controller 40 receives messages for the pagers typically from senders using telephones 42, the messages are received by message receiving means 44, and the size of the message may be limited by message limiting means 46. Protocol determining means 48 stores the message in a message memory means 50 in a corresponding protocol buffer 52, 54 or 56. Additionally, the protocol determining means starts a timer in timing means 60 in the appropriate protocol timer 62, 64 or 66 if the corresponding protocol buffer is empty when the message is stored. The timer's use includes determining the age of messages within the protocol buffers. When a protocol buffer is ready to transmit, a corresponding protocol formatter 68, 70 or 72 formats the contents of the buffer into a transmittable protocol and submits the protocol to transmitter 74, thereafter the messages within the protocol are transmitted to selective call receivers.

A protocol may be a Golay, POCSAG, 5/6 tone, or twotone message. In the present invention, POCSAG messages would be stored in a protocol buffer corresponding to POCSAG. Golay messages with a common preamble would be stored in a common protocol buffer. Five/six tone messages and two-tone messages may be stored in another common buffer. It should be noted that although only three protocol buffers are shown in FIG. 2, the number of protocol buffers, as well as the number of protocol timers and protocol formatters, may be extended to include all the necessary protocols handled by the paging terminal.

The message size the message limiting means 46 limits the incoming message to is determined by analyzer and control means 76. The message receiving means identifies message characteristics for the analyzer and control means 76. The message characteristics allow the control means 76 to determine the message protocol and the individual maximum message size associated with the pager. The analyzer and control means then, in response to the control memory means 78, the time of day clock 80 and the parameter input device 82, determines the appropriate size for limiting the message and causes the message limiting means 46 to correspondingly limit the size of the incoming message.

The analyzer and control means 76 additionally determines the size of the messages within each buffer in memory means 50 as well as the age of the messages within the protocol buffers as indicated by the corresponding protocol timer in timing means 60 and then generates transmit signals. The determination for the size and/or age of a protocol buffer are determinate in response to input from control memory means 78, time of day clock 80 and parameter input device 82. The transmit signals are then delivered to the corresponding protocol formatter 6872 and the messages ultimately transmitted through transmitter 74.

Figure 3:
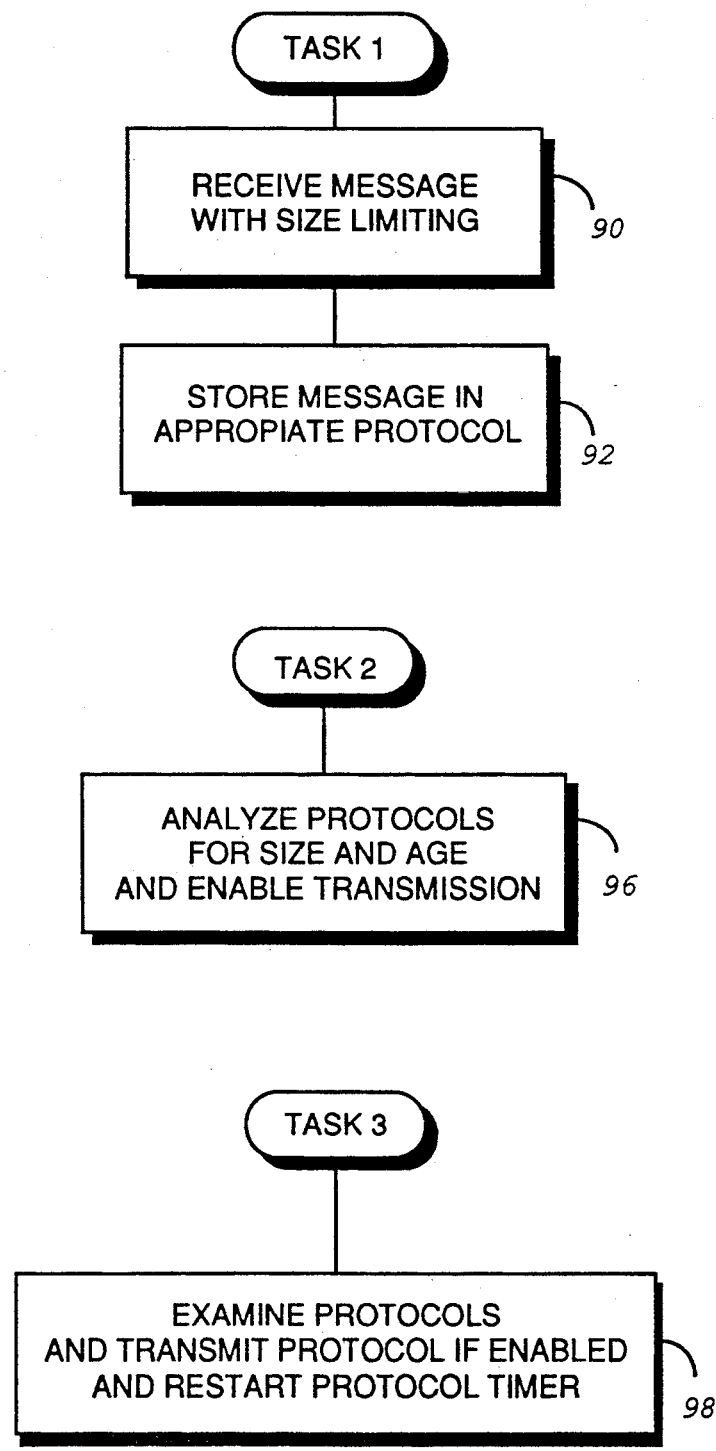
FIG. 3 shows tasks within the multi-tasking environment of the paging terminal necessary to perform the functions of the present invention.

The operation of paging terminal 40 may be typically controlled by a computer base paging terminal such as the Modax paging terminal manufactured by Motorola, Inc. The general operation of computer-based paging terminals are well known to those familiar with the art and generally operate with multi-tasking software. FIG. 3 shows tasks within the multi-tasking environment of the paging terminal necessary to perform the functions of the present invention. Step 90 of task 1 shows the process of receiving a message with size limiting. Step 92 of task 1 shows storing the message within an appropriate protocol. Step 96 of analyzing task 2 shows the process of analyzing protocol for size and age and enabling transmission of the protocol. Step 98 of task 3 shows the step of examining the protocols and transmitting the protocol if enabled and restart the protocol timer. In the multi-tasking environment, tasks 1, 2, and 3, as well as additional tasks necessary to perform the proper operation of the paging terminal, are effectively performed concurrently. Thus, the programs within each task effectively operate simultaneously. A detailed description of tasks 1 through 3 follows herein.

There are several techniques for determining message size. A first technique is to monitor the time that a telephone 42 is connected to message receiving means. This technique results in a message size measured in seconds. A second technique is to determine the amount of air time a message consumes while being transmitted. With this technique, message size is also measured in seconds. A third technique is to measure the amount of message memory occupied by the message while stored in the message memory means 50. Since voice messages are typically digitized and stored in binary memory prior to transmission, and digital messages are also stored in binary memory, it is possible to measure the size of a message by determining the number of binary elements the message occupies within the message memory means. Each of these techniques works well, and each protocol within the terminal may have a different technique for measuring message size.

Figure 4:
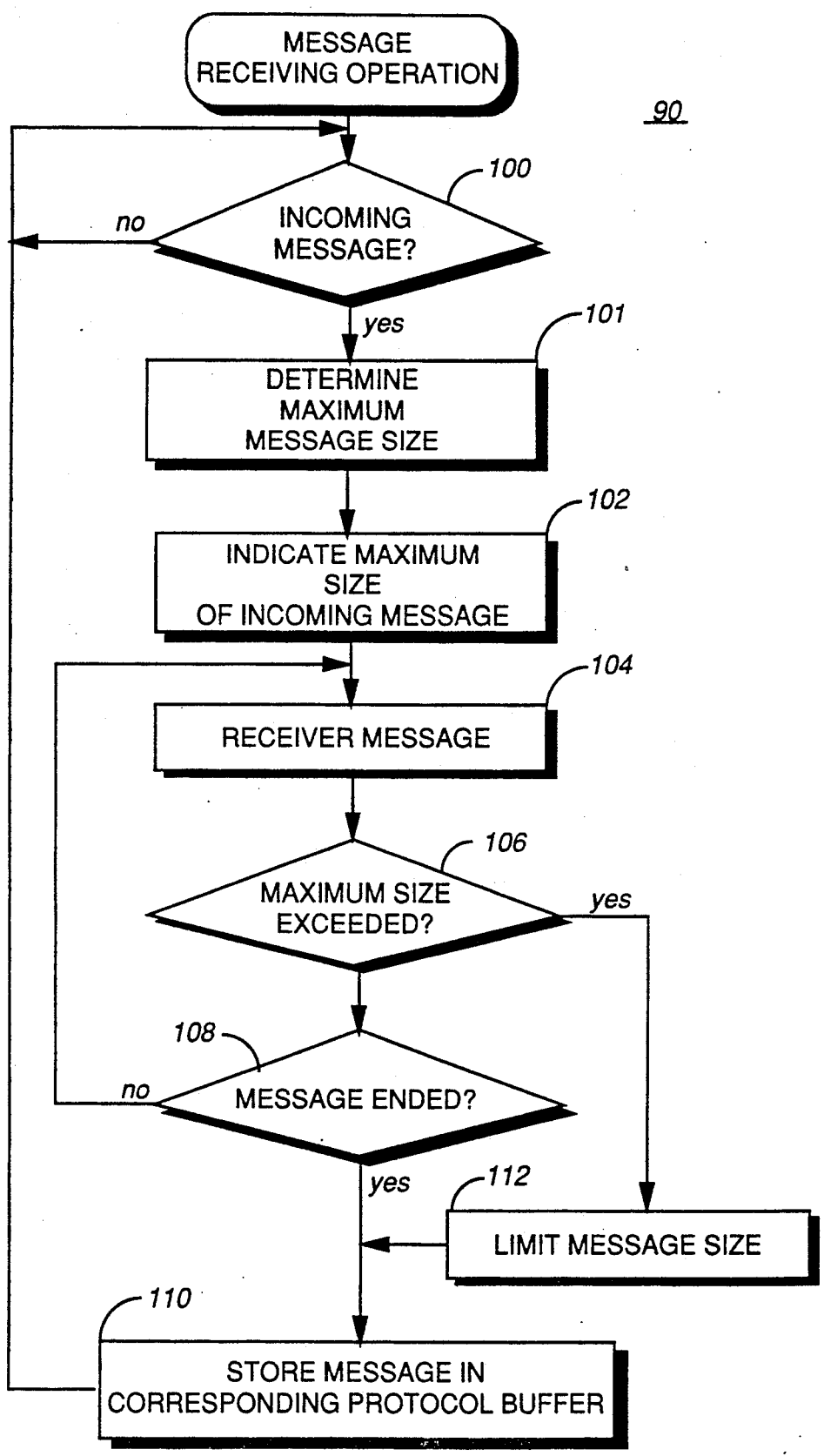
FIG. 4 shows a flow chart of the message receiving operation.

FIG. 4 shows a flow chart of the message receiving operation, step 90, of task 1. The computer program within the paging terminal in step 100 checks if an incoming message is being received from a sending unit 42. If no message is received, the program returns to step 100 until a message is received. In the event a message is received, the program proceeds to step 101 to determine the maximum size of the message. The maximum size may be common to all messages received by the paging terminal. Alternatively, the maximum size may depend upon message characteristics such as the protocol of the message or the individual user preference for maximum message length. It can be appreciated that a number of individual users desiring the same maximum message length can be formed into a user group. Thus, a message characteristic can include a user group and the maximum message length can be determined accordingly. The program then proceeds to step 102 to indicate the maximum size of the incoming message. In the event of a voice message, the indication of step 102 would take the form of a message from the paging terminal to the caller indicating that a voice message of up to say seven seconds, for example, will be accepted. As will be detailed later, the maximum size of the incoming message may vary either by the time of day or by the size of messages held within the paging terminal, and the maximum size indication corresponds to the current maximum message size accepted by the paging terminal. The program then proceeds to step 104 to receive the message. The program then proceeds to step 106 to check that the maximum size is not exceeded. If the maximum size is not exceeded, the program proceeds to step 108 to check if the message is ended. In a voice message, the message may have been ended by the caller hanging up the telephone. If the message is not ended, the program returns to step 104 to continue receiving the message. If in step 108 the message is ended, the program proceeds to step 110 to store the message in a corresponding protocol buffer. If, however, in step 106 the maximum size is exceeded, the program proceeds to step 112 to limit the message size. Limiting the message size may include truncating the message when the maximum sizes is reached. In the case of a voice message, limiting the message size may also include removing the silence spaces from the voice message in order to keep the voice message limited to the maximum size.

FIG. 5 shows a technique for determining the maximum message size of step 101 of FIG. 4. First, in step 120, the time of day is determined. The time of day is determined by examining the time of day clock 80. Second, in step 122, the maximum message size looked up in the control memory means 78 corresponding to the time of day and the message characteristic.

FIG. 6 shows an alternate technique for determining the maximum message size of step 101. In step 126, analyzer and control means 76 examines the size of the messages within the message memory means 50 including the protocol buffers, 52, 54 and 56, and determines the total size of the messages therein. Note that it is not necessary that the determination be made based upon all buffers within memory means 50, for example, a representative number of buffers or a particular set of buffers may be chosen for the total size determination. Next, in step 128, the program looks up the maximum message size held within the control memory means 78 corresponding to the total message size determined in step 126 and the message characteristic.

FIG. 7 shows another alternate technique for determining the maximum message size of step 101. In step 130, the time of day is determined from time of day clock 80. The program proceeds to step 132 to determine the total size of messages within the message memory means as described in step 126 of FIG. 6. The program then proceeds to step 134 to look up a time message size in the control memory means corresponding the time of day and the message characteristic. The program then proceeds to step 136 to determine the maximum message size as the time message size of step 134 minus the total message size of step 132 times a number .01.

Figure 8:
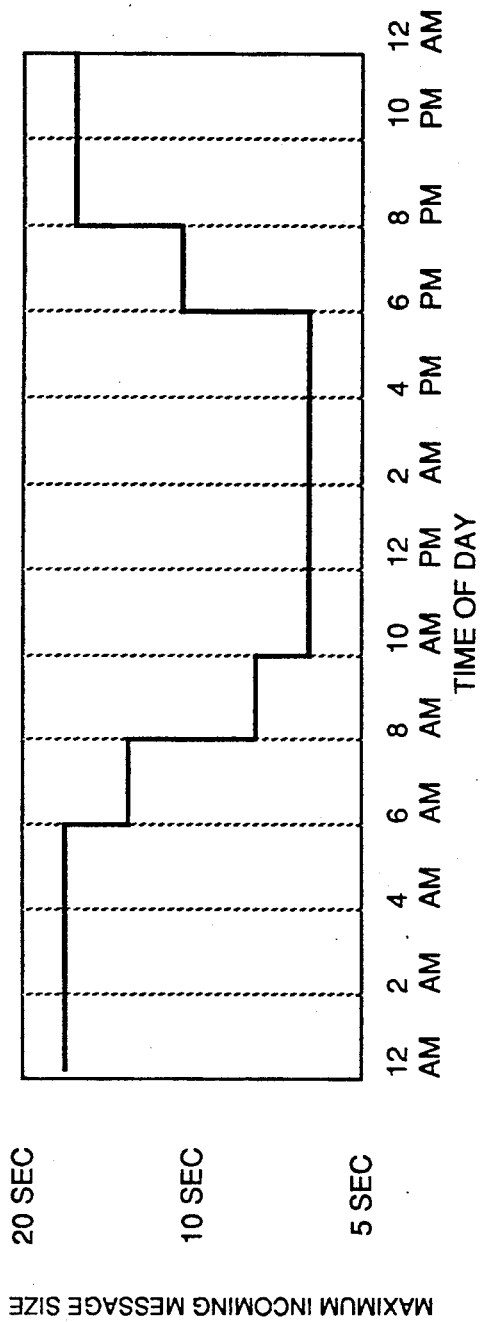
FIG. 8 shows a graphical representation of the relationship between the time of day and the maximum incoming message size.

FIG. 8 shows a graphical representation of the table of numbers held within control memory means 78. The table of numbers indicate the relationship between the time of day and the maximum incoming message size. Memory means 78 may have a plurality of tables, each table having a different relationship between time of day and the maximum message size wherein each table corresponds to a particular message characteristic. It can be seen from FIG. 8 that during the early morning hours 12:00 A.M. to 6:00 A.M. when the channel is usually lightly loaded, the maximum message size is longer, typically up to 18 seconds. As the day progresses, the incoming message size gradually decreases until during peak loading between the hours of 10:00 A.M. to 4:00 P.M. The maximum message size is limited to about 7 seconds. Then the maximum message size is allowed to increase to the 18 second message size and the cycle repeats. The graphical representation of FIG. 8 also represent the maximum message size determined in step 122 as well as the time message size determined in step 134.

When the system is lightly loaded, the message sizes are typically allowed to be long, up to 18 seconds and then as the system loading is expected to increase, the maximum incoming message size is decreased, thus allowing for long messages when the channel is lightly loaded and shortening the message as the channel loading increases.

It should be noted that although FIG. 8 shows a maximum message size of about 7 seconds between the hours of 10:00 AM and 6:00 PM, FIG. 8 could, for example, be redrawn to allow zero seconds between these hours. This would effectively eliminate paging service during the time between 10:00 AM and 6:00 PM to the pager user having such a message characteristic. A pager user with such a message characteristic would be able to economize on paging service by only receiving pages at times when the paging terminal is not heavily loaded. Between the hours of 10:00 AM and 6:00 PM, no messages of this message characteristic would be received by the paging terminal. If a message were received between the hours of 10:00 AM and 6:00 PM, step 102 of FIG. 4 could inform the caller that messages were not being received at this time and that messages would be received after 6 PM.

Figure 9:
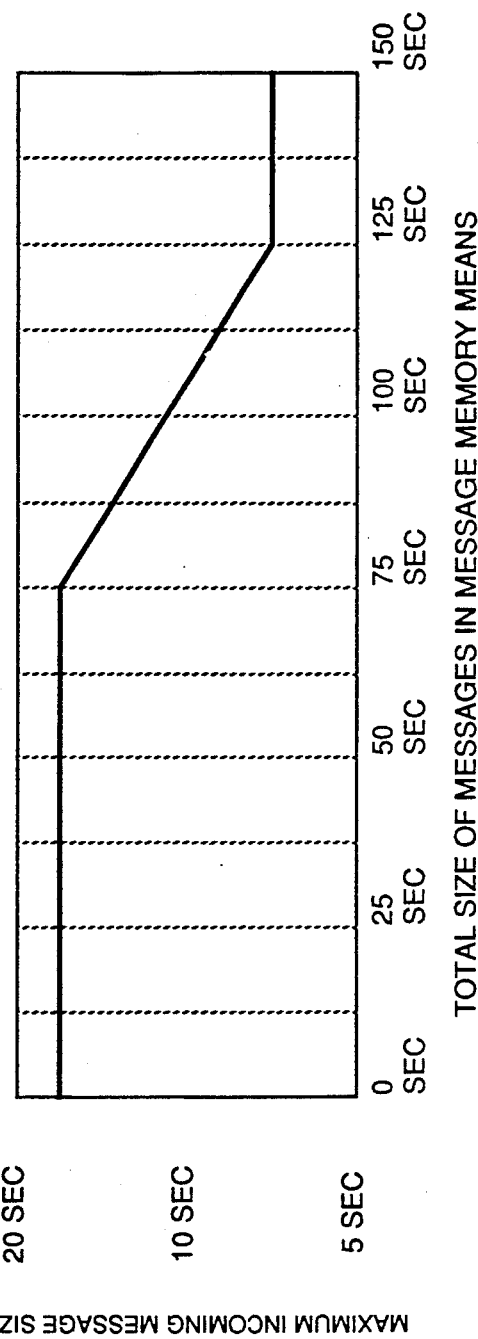
FIG. 9 shows a graphical representation of the relationship between the maximum message size and the total size of messages held within the message memory means.

FIG. 9 shows a graphical representation of the table within the control memory means 78 relating the maximum message size to the total size of messages held within the message memory means 50 and the message characteristic. Note that the total message size is indicative of the system loading. As can be seen from FIG. 9, the maximum incoming message size is limited to 18 seconds when the total message size is less then 75 seconds. As system loading increases, the total message size decreases. As the total message size increases from 75 to 125 seconds, the maximum income message size decreases from 18 seconds to 7 seconds. As the total message size increases beyond 125 seconds, the maximum incoming message is limited to 7 seconds. It can be appreciated that a pager user wishing to economize on paging service could subscribe a message characteristic that had a message time of zero seconds at a predetermined total message size. In such a case, the messages of this message characteristic would not be received by the paging terminal when the total message size reached a predetermined size. The maximum incoming message size of FIG. 9 is the value determined in step 128 of FIG. 6.

Figure 10:
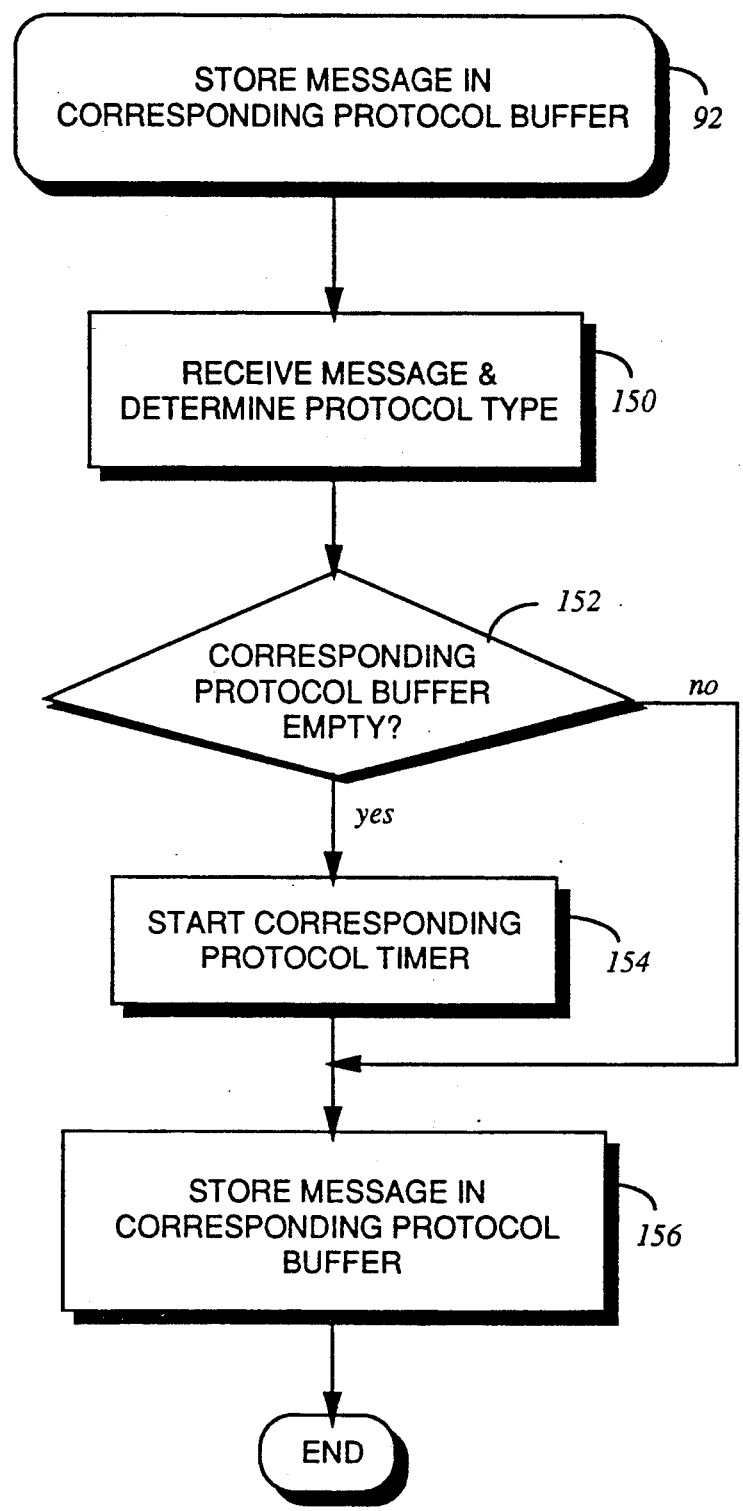
FIG. 10 shows a flow chart for storing a message in a corresponding protocol buffer.

FIG. 10 shows the flow chart for storing a message in a corresponding protocol buffer. This corresponds to step 92 of task 1 of FIG. 3. First, the program receives the messages and determines the protocol type in step 150. The program proceeds to step 152 to check if the corresponding protocol buffer is empty. If in step 152 buffer is empty, the program starts the corresponding protocol buffer timer in timing means 60 in step 154. The program then proceeds to step 156 to store the message in the corresponding protocol buffer. If in step 152 the corresponding protocol buffer is not empty the program then proceeds to step 156.

Figure 11:
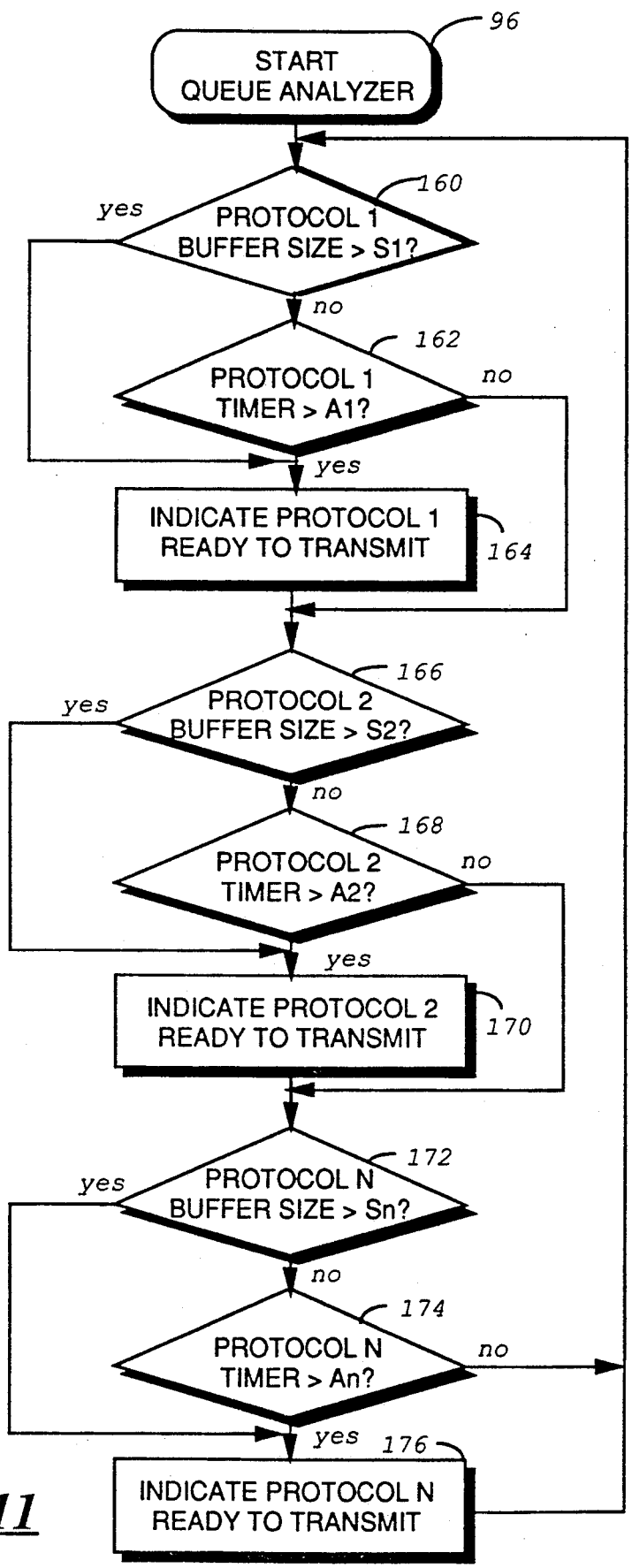
FIG. 11 shows a flow chart detailing the analysis of protocols for size and age and enabling transmission in response thereof.

FIG. 11 shows a flow chart detailing the analysis of protocols for size and age enabling transmission in response thereof. This corresponds to the operation, step 96 of task 2, of the multi-tasking operation of the paging terminal. In FIG. 11, the values of S1 through Sn and A1 through An are constant at any point in time. However, the multi-tasking paging terminal constantly adjusts these values. FIGS. 13-22 show flow charts detailing the adjustment of these values. In step 160, protocol 1 buffer size is determined and the size is checked to be greater than the value S1. If the value is not greater than S1, the program proceeds to step 162 to check if the protocol 1 timer has a value greater than A1. If the protocol has a value greater than timer A1 in step 162, or if the protocol has a size greater than S1 in step 160, the program proceeds to step 164 to indicate that the protocol 1 buffer is ready to transmit.

The program then proceeds to step 166 from either step 162 or step 164. Similar to step 160, in step 166, protocol 2 buffer size is determined and if the buffer size is less than a value S2, the program proceeds to step 168 to check if protocol 2 timer has a value greater than a A2. If the protocol 2 timer has a value greater than A2 or if a protocol to buffer size has a size greater then S2 in step 166, the program proceeds to step 170 to indicate that the protocol 2 buffer is ready to transmit.

Figure 12:
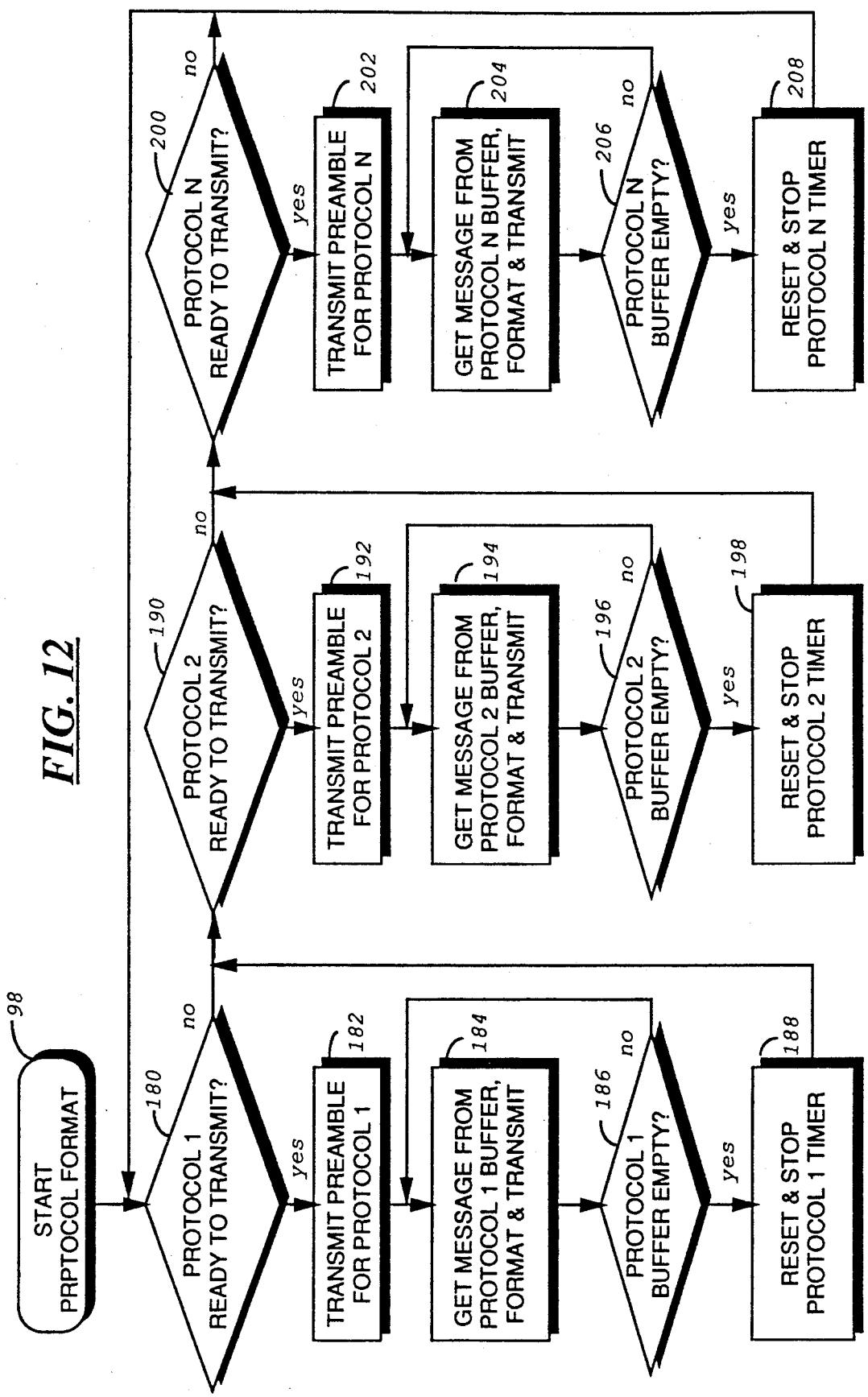
FIG. 12 shows the operation of the format controller.

The program proceeds from either step 168 or step 170 to step 172 to check if protocol in buffer is greater than a value Sn. If not, the program proceeds to step 174 to check if the protocol in timer has a value greater than An. If in step 174 the protocol timer has a value greater than An or if in step 172 the buffer size has a value greater than Sn, the program proceeds to 176 to indicate that protocol N is ready to transmit. It can be appreciated that although only 3 protocol buffers are shown here protocol 1, protocol 2 and protocol n, FIG. 11 can be extended to include as many protocol and protocol buffers as required to operate the paging terminal FIG. 12 shows the operation of the format controller of step 98 of task 3 of the multi-tasking environment of the paging terminal. First, in step 180, the protocol 1 is checked to be ready to transmit. The determination to transmit was made in step 164 of FIG. 11. If the protocol 1 is ready to transmit, the program proceeds to step 182 to transmit any necessary preamble for protocol 1. Necessary preambles for protocol such as the POCSAG and Golay protocols are well known to those familiar with the art. The program then proceeds to step 184 to get a message from the protocol 1 buffer and format and transmit the message. The program then proceeds to step 186 to check if the protocol 1 buffer is empty. If in step 186 the protocol 1 buffer is not empty, the program returns to step 184 to get the next message from the protocol buffer. After all of the messages from the protocol buffer are transmitted, the program proceeds to step 188 to reset and stop the protocol 1 timer within the timing means 60. Note that the protocol 1 timer will be restarted by execution of step 154 when a message is stored in protocol. After completion of step 188, the program proceeds to step 190. Also in step 180, if the protocol 1 buffer was not ready to transmit, the program proceeds to step 190. In step 190, protocol 2 buffer is checked to be ready to transmit. The indication that this buffer is ready to transmit was made in step 170 of FIG. 11. If protocol 2 buffer was ready to transmit, the program proceeds to step 192 to transmit any necessary preamble for protocol 2. The program then proceeds to step 194 to get a message from the protocol 2 buffer 54 of message memory means 50 and format and transmit the message. The program then proceeds to step 196 to check if the protocol 2 buffer is empty. If in step 196 the protocol 2 buffer is not empty, the program returns to step 194 to get the next message. The program executes steps 194 and 196 until the protocol 2 buffer is empty, at which time the program proceeds to step 198 to reset and stop the protocol 2 timer. The program then proceeds to step 200. Also if in step 190 the protocol 2 buffer is not ready to transmit, the program proceeds to step 200. In step 200, protocol N. is checked to be ready to transmit, the protocol N buffer being indicated ready to transmit by step 176 of FIG. 11. If protocol N is ready to transmit, the program proceeds to step 202 to transmit any necessary preamble for protocol N. The program then proceeds to step 204 to get a message from the protocol N buffer and format and transmit it in a manner similar to steps 184 and 194. The program then proceeds to step 206 to check if protocol N buffer is empty. If protocol N buffer is not empty, the program executes steps 204 to 206 until the buffer is empty. When the protocol N buffer is empty, the program proceeds to step 208 to reset and stop the protocol N timer. After step 208, or if in step 200 the protocol N buffer is not ready to transmit, the program returns to step 180 to examine the protocol 1 buffer for being ready to transmit.

FIG. 12 shows how the program scans each of the protocol buffers within the paging terminal. When a buffer is ready to transmit, the messages within the buffer are transmitted.

FIG. 13 shows a technique for determining the value $S_n$ used in FIG. 11 for determining the maximum size of a buffer before it is ready to transmit. The values for $S_n$ in this figure, as well as in FIGS. 14 and 15, may be common to all protocols, or each protocol may have a unique value of $S_n$, thereby allowing each protocol to have a unique maximum buffer size. In step 220, the time of day is determined from time of day clock 80. Then in step 222, the value for $S_n$ corresponding to the protocol is looked up in control memory means 78 for the time of day.

FIG. 14 shows an alternate technique for determining the maximum buffer size $S_n$. In step 224, as in step 126, the total size of the messages within message memory means 50 is determined. In step 226, the value for $S_n$ corresponding to the buffer is looked up in control memory means 78 corresponding to the total message size determined in step 224.

FIG. 15 shows another alternate technique for determining the maximum buffer size for $S_n$. In step 228, the time of day is determined from time of day clock 80. As in step 126, the total size of the messages within message memory means 50 is determined in step 230. In step 232, a value for $S_m$ is looked up in control memory means for the time of day. Then in step 234, a value for $S_n$ is calculated as the $S_m$ value of step 232 plus the total message size of step 230 times a number of 0.01.

Figure 16:
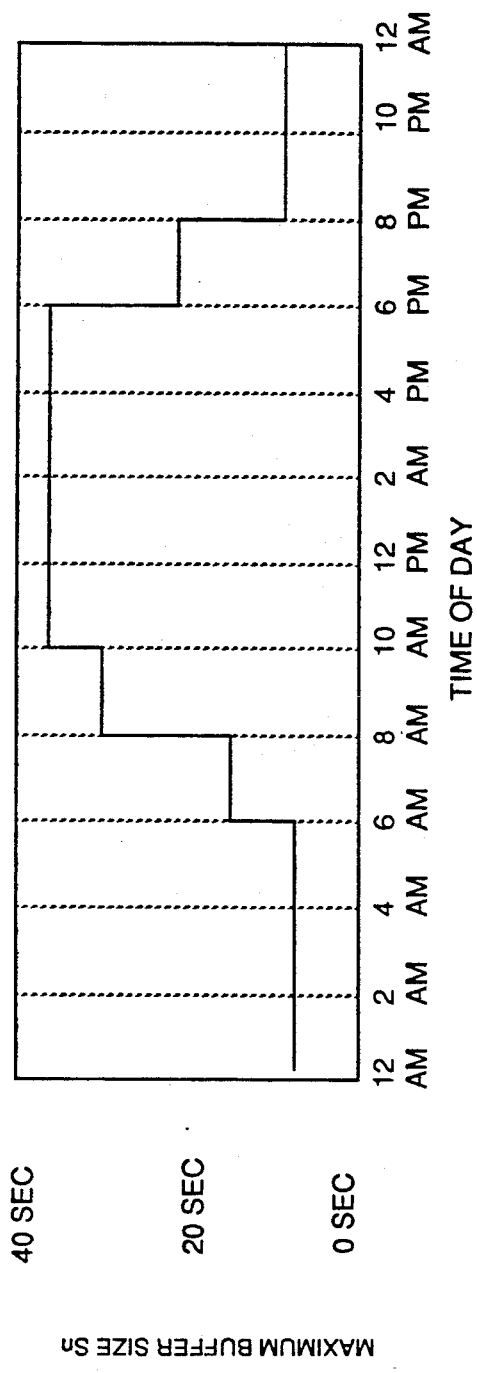
FIG. 16 shows a graphical representation of the relationship between the maximum buffer size and the time of day.

FIG. 16 shows a graphical representation of a table within the control memory means 78 relating the maximum buffer size $S_n$ to the time of day. During the early morning hours 12:00 A.M. through 6:00 A.M. when the system is lightly loaded, the maximum buffer size is about 10 seconds. As the day progresses and the loading gradually increases until peak loading between 10:00 A.M. and 4:00 P.M., the maximum buffer size is increased to 40 seconds. Then as channel loading gradually decreases to 8:00 P.M., the maximum buffer size $S_n$ is decreases to about 10 seconds. Note that this technique requires that a larger size protocol be held prior to transmission during the heavily loaded times of the system operation. Transmitting a large number of messages within a protocol increases the overall throughput as described earlier. However, during the lightly loaded hours, the size of the protocol prior to transmission is reduced enabling more rapid transmission of messages help within the paging terminal.

Figure 17:
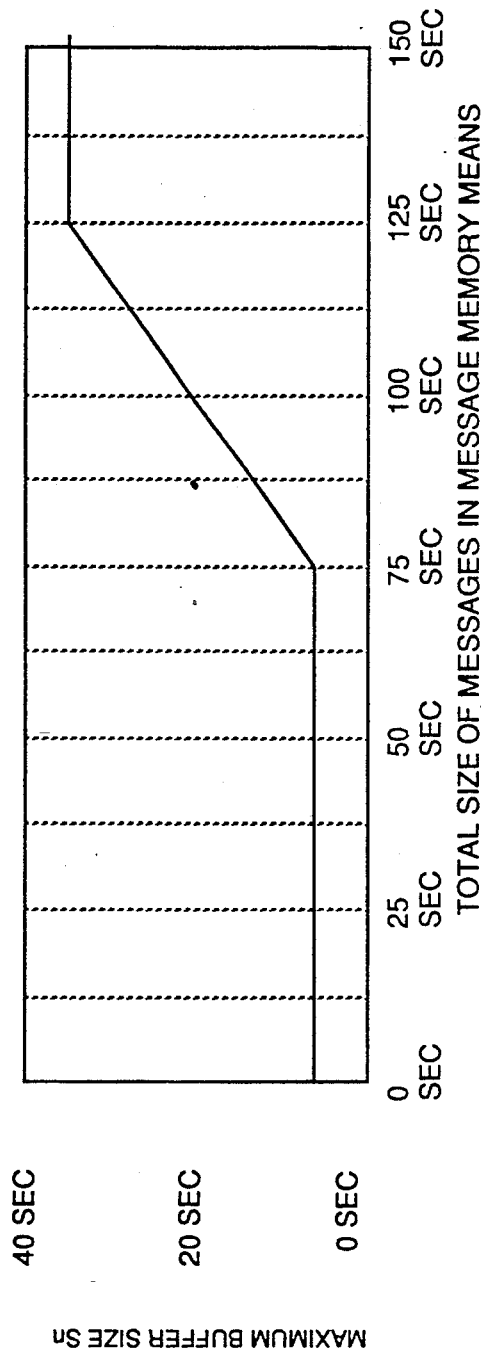
FIG. 17 shows a graphical representation of the relationship between the maximum buffer size and the total size of the messages held within the message memory means.

FIG. 17 shows a graphical representation of a table within control memory means 78 relating the maximum buffer size $S_n$ to the total size of the messages held within the message memory means. The values of FIG. 16 are used in steps 222 for $S_n$ as well as step 232 for $S_m$. The value for $S_n$ of FIG. 17 is used in step 226 of FIG. 14. Note in FIG. 17 that when the total size of the messages within the message memory means is less than 75 seconds, the maximum buffer size before transmission is about 10 seconds. However, as the total size of messages within message memory means increase from 75 seconds to 125 seconds, the maximum buffer size before transmission of the buffer is increased to about 38 seconds. Then, beyond the 125 seconds total message size within the message memory means, the maximum buffer size is held to 38 seconds. Note that as the total size of the message in the memory means increases beyond 75 seconds, this indicates that the channel is becoming more heavily loaded. Thus, as the channel becomes more heavily loaded, the size of the messages within a buffer increases before the buffer is transmitted. This graph shows another technique for increasing the size of the messages held within a buffer prior to transmission as a function of the system loading.

Figure 18:
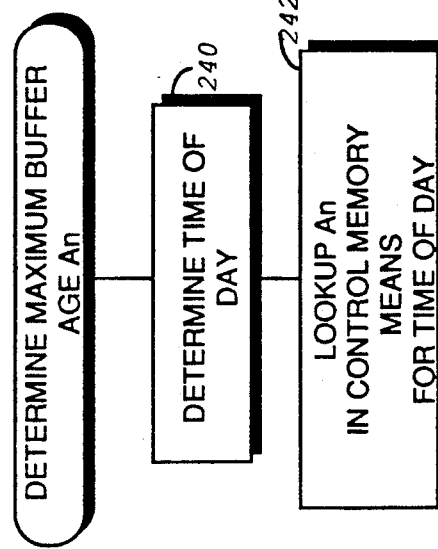
FIG. 18 shows a technique for determining the maximum age of a buffer.

FIG. 18 shows a technique for determining the maximum buffer age An and represents a value for A1 in step 162, A2 step 168, and through as many protocols as required through An in step 174. For FIGS. 18, 19, and 20, the value for An may be the same for all protocols or may be independent from one protocol to the next. In FIG. 18, step 240, the time of day is determined from time of day clock 80. Then in step 242, a value for An is looked up in control memory means 78 corresponding to the time of day. This value for An may be used in steps 162, 168, and 174.

Figure 19:
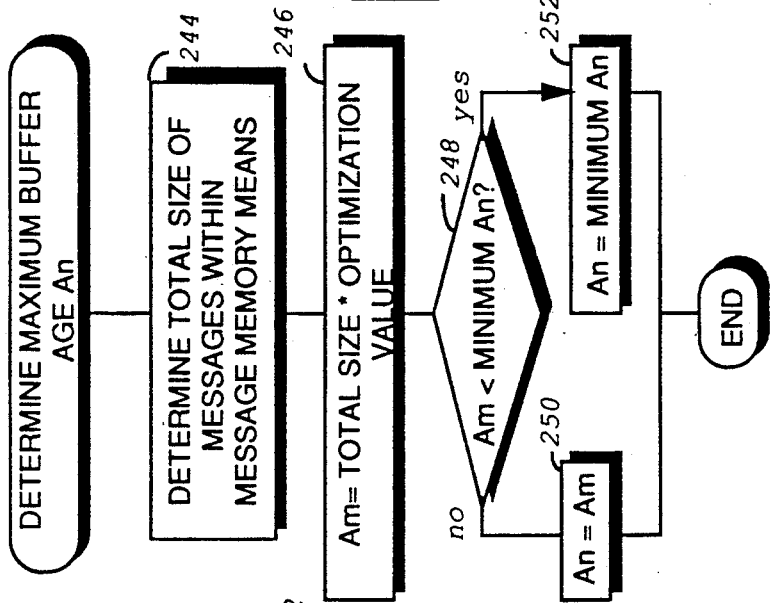
FIG. 19 shows an alternate technique for determining the maximum buffer age.

FIG. 19 shows an alternate technique for determining the maximum buffer An. In step 244, as in step 126, the total size of the messaged within message memory means 50 is determined. Then in step 246, a value Am is determined to be a product of the total size determined in step 244 times an optimization value. Then in step 248, the value Am is checked to be less than a minimum value for An. If in step 248 Am is not less than a minimum value, then in step 250, An is made equal to a Am. However, if in step 248 Am is less than An, the minimum value for An is chosen in step 252. The value chosen in 250 or step 252 is used for An in steps 162, 168, and 174. The optimization value of step 246 may be either a predetermined optimization value or entered from the parameter input device 82. This technique allows a system operator to have control over the maximum age of messages help within the paging terminal prior to transmission.

Figure 20:
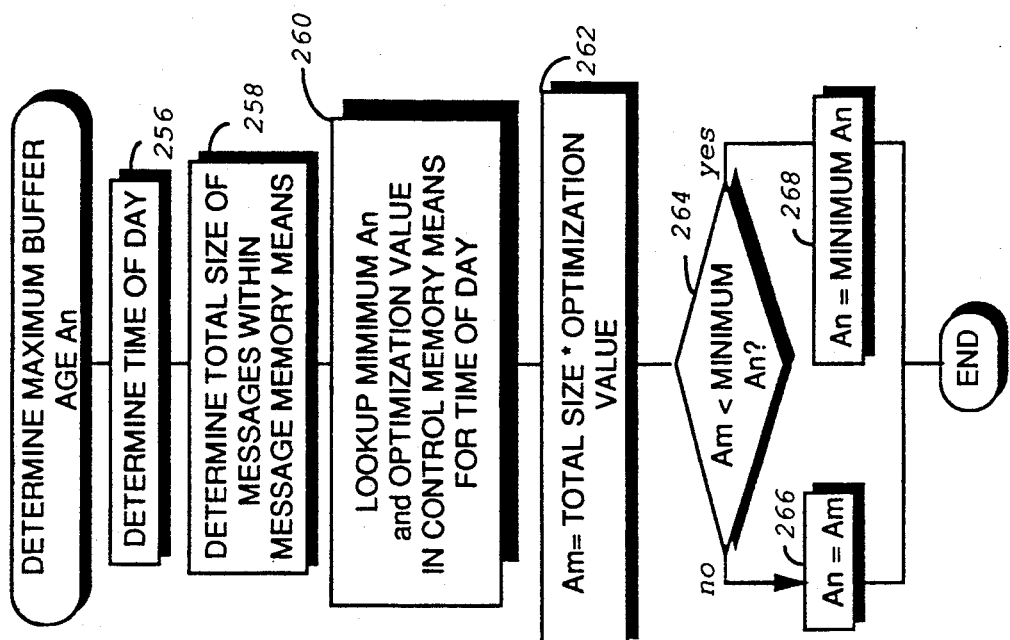
FIG. 20 shows another alternate technique for determining the maximum buffer age.

FIG. 20 shows another alternate technique for determining the maximum buffer age An. In step 256, the time of day is determined from time of day clock 80. Then in step 258, as in step 126, the total size of messages was in message memory means 50 is determined. In step 260, minimum values for An and an optimization value are looked up in the control memory means 78 based upon the time of day. This step allows An and the optimization value to be be varied by the time of day and the expected system loadings at these times of day. Then in step 262, a value for Am is chosen to be the total size determined in step 258 multiplied by the optimization value determined in step 260. Then in step 264, the value of An of step 262 is determined to be less than a minimum value for An determined in step 260. If it is not, the value for An is chosen to be equal to Am in step 266, otherwise in step 268, the value for An is chosen to be equal to a minimum An. The technique shown in FIG. 20 provides for both a minimum age of a buffer prior to transmission when the system is not busy, and as the paging channel grows busier, the minimum age becomes a product of the total size of the messages within the paging terminal to be varied as the time of day.

Figure 21:
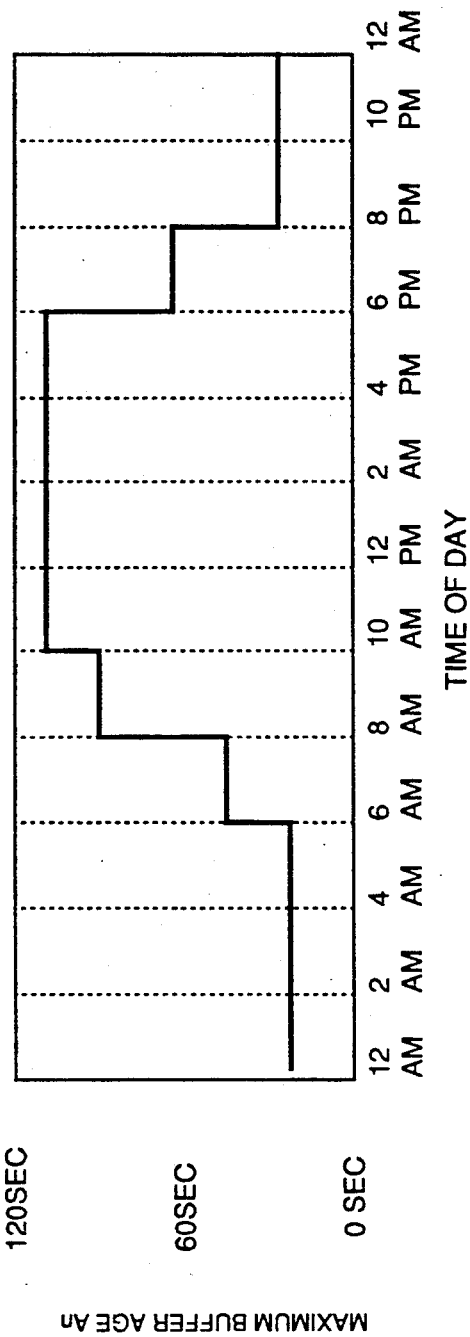
FIG. 21 shows a graphical representation of the relationship between the maximum buffer age and the time of day.

FIG. 21 shows a graphical representation of a table within control memory means 78 equating the maximum buffer age An with the time of day. Note that during the times between 12:00 A.M. and 6:00 A.M. when the system is lightly loaded, the maximum buffer age is low, about 20 seconds. As the day progresses and loading gradually increases to a peak loading between 10:00 A.M. and 4:00 P.M., the maximum buffer age is increased to about 115 seconds. Then as system loading gradually decreases, the maximum buffer age prior to transmission is decreased to about 20 seconds. This technique allows a buffer age to build up a optimal size prior to transmission during a heavily loaded time. However, when the channel is not heavily loaded, the buffer age prior to transmission is decreased, thus providing for quicker message handling during a lightly loaded time. The buffer age corresponds to the values of An in step 242 and the minimum An of step 260.

Figure 22:
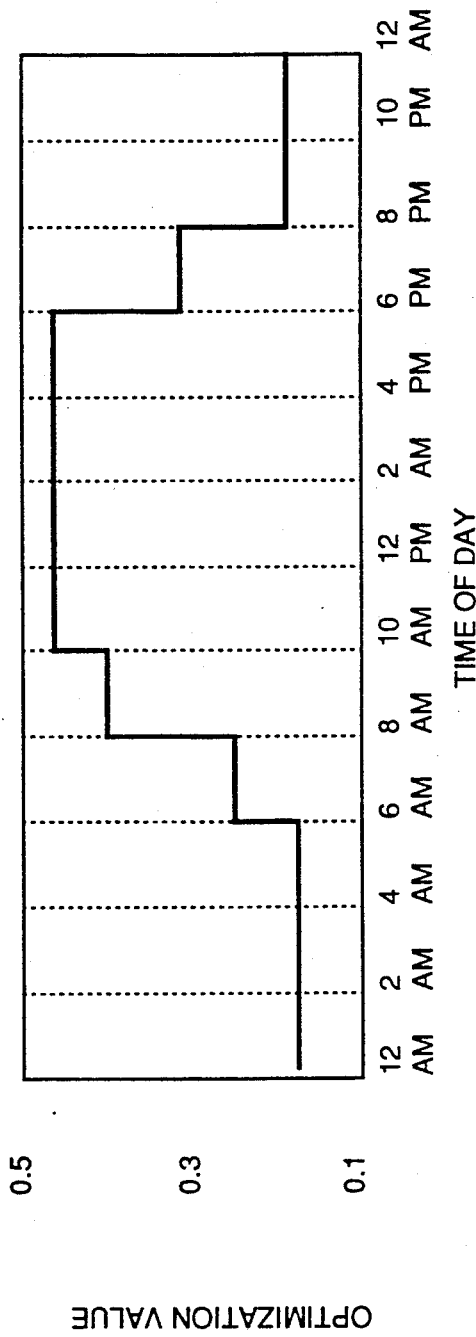
FIG. 22 shows a graphical representation of the relationship between the optimization value and the time of day.

FIG. 22 shows a graphical representation of a table within the control memory means 78 relating the optimization value used in steps 246 and 262 versus the time of day. Note that during the lightly loaded hours between 12:00 A.M. and 6:00 A.M., the optimization value is low, approximately 0.2, and then as the day progresses, the optimization value gradually increases until peak loading hours between 10:00 A.M. and 4:00 P.M. where the optimization value is approximately 0.45. Then as system loading decreases, the optimization value returns to approximately 0.2. This technique allows the maximum age being a product of the total size of messages within a memory means and the optimization value to be varied as the system loading varies. This technique also allows the age of the messages within the buffer to increase as system loading increases giving the buffer more time to reach an optimal size prior to transmission.

Figure 23:
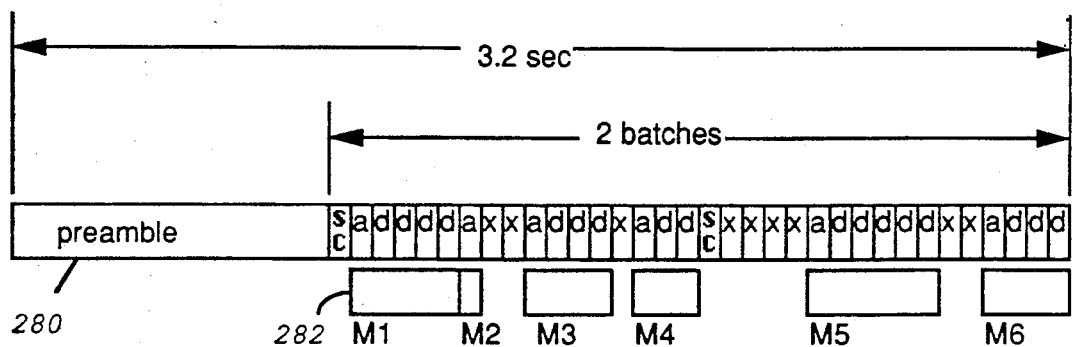
FIG. 23 shows a typical protocol transmission of the POCSAG protocol as well as ways for determining the size of the POCSAG protocol transmission.

The size of messages within a protocol buffer has been referred to as measured in seconds. However, a number of ways exist to represent the size of messages within a buffer. It is desirable to vary the criterion for determining the size of a buffer with respect to system loading. FIG. 23 shows a typical protocol transmission of the POCSAG protocol. The operation of the POCSAG system is well known to those familiar with the art and will not be detailed herein. The POCSAG transmission shown in FIG. 23 consists of a POCSAG preamble signal and two POCSAG batches. Each POCSAG batch is preceded with a sync code indicated by the label SC in slots on line 280. Between each of the sync codes are 16 slots containing either address information, data information or idle code information. A message consists of an address optionally followed by data. An address is indicated by the letter A in a slot, data is indicated by the letter D in the slot, and an idle code which contains neither address nor data information is represented by the letter X in the slot. The first way to measure the size of this protocol transmission is to measure the overall time required to transmit the preamble and the two batches. This time is 3.2 seconds. A second way to indicate the size of this transmission is to count the number of batches having message information in them. Using this criterion, the protocol represented by FIG. 23 has a size of two batches. A third technique for determining the size of the protocol is to count the number of messages within the protocol. In this case, line 282 details the messages within the batches. In this example, there are six messages total, and using this technique, the protocol would have a total size of six messages. A fourth technique to determine the size of the protocol transmission is to determine the amount of information necessary to be stored within the memory means or within the protocol buffer in order to create the transmission. This can be determined by counting the number of address and data slots within the protocol. In this example, there are six slots having address information and sixteen slots having data information resulting in a total size of 22 slots, the 22 slots being indicative of the size of the memory used by the protocol buffer.

Figure 24:
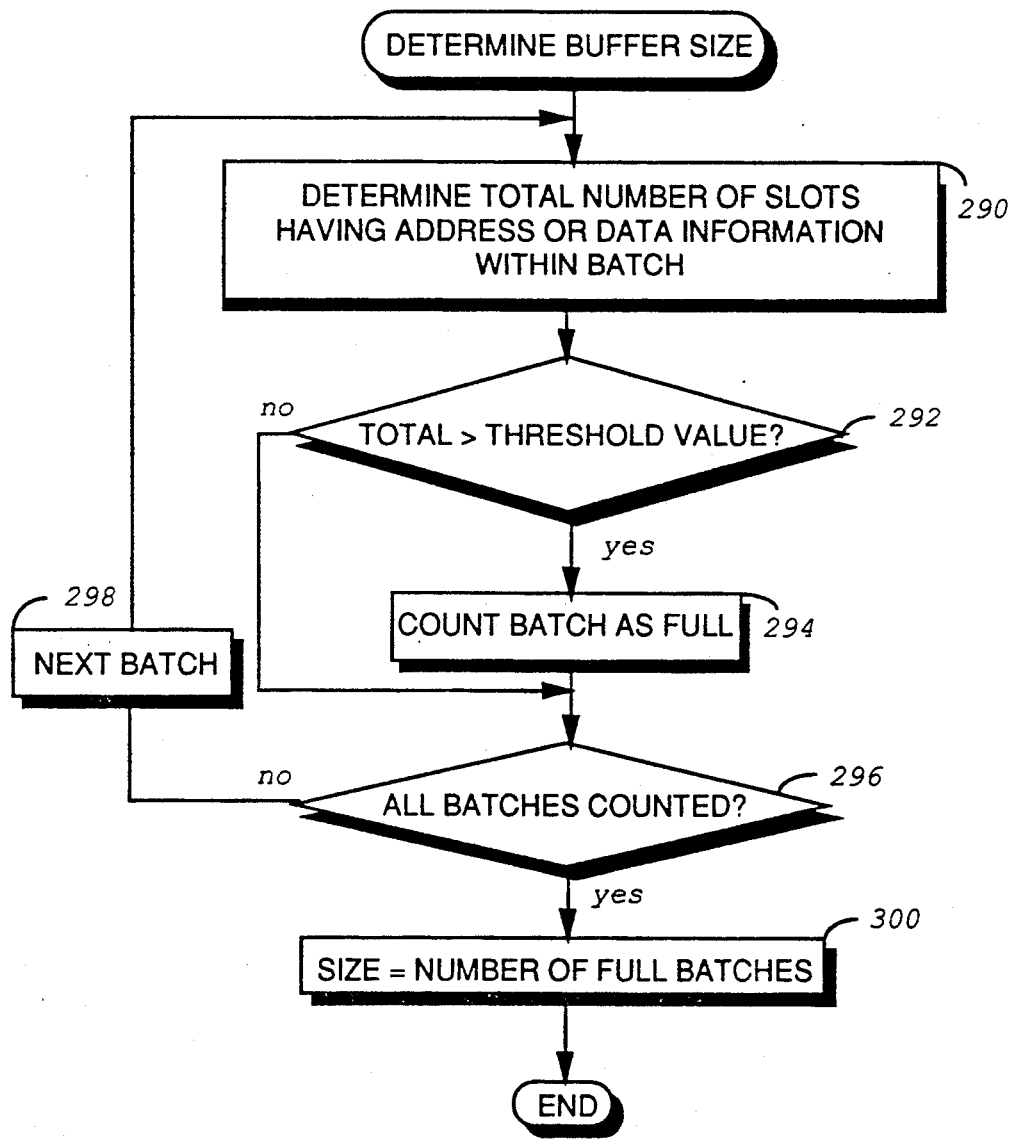
FIG. 24 shows a flow chart indicating a technique for determining the size of the POCSAG protocol shown in FIG. 23.

FIG. 24 shows a flow chart indicating a fifth technique for determining the size of the buffer show in FIG. 23. The flow chart of FIG. 24 shows a way to vary the criterion for determining the size of a POCSAG buffer with respect to system loading. First, in step 290, the total number of slots having address or data information within a batch is determined. Note that each batch has a constant sixteen slots. Then in step 292, this value is checked to be greater than a threshold value. If this is greater than a threshold value, the batch is counted as full in step 294. However, if not, the program proceeds to step 296 to check if all batches have been counted. If all batches have not been counted, the program proceeds to step 298 to check for the next batch and execute the steps of 290 through 296 until all batches are counted. Finally, in step 300, the size is determined to be equal to the number of full batches determined by execution of step 294, the size resulting from step 300 being the size of a POCSAG protocol buffer contained within the message memory means 50.

Note that the threshold value 292 may be predetermined. In the case of POCSAG, if the threshold value is 12 slots, FIG. 24 requires that at least 12 slots within a batch have address or data information in order for that batch to be considered full. For example, using FIG. 23, the first batch contains 13 slots having address or data information. Under this criterion, the first batch would be considered full. However, the second batch has only 10 slots having address or data information. Under this criterion, the second batch would not be considered full. Thus, the size of the protocol buffer shown by FIG. 23 would be one batch.

FIG. 25 shows a technique for determining the threshold value used in step 292. First, in step 310, the time of day is determined from time of day clock 80. Then in step 312, a threshold value corresponding to the time of day is looked up in control memory means 78. This technique allows the control value to be varied by the time of day, thereby regulating the amount of slots containing address and data information necessary for a batch to be considered to be full based upon the time of day.

FIG. 26 shows an alternate technique for determining the threshold value used in step 292. First, in step 314, similar to step 126, the total size of messages within the memory means excluding a POCSAG buffer is determined. Second, in step 316, the threshold value corresponding to the total size is looked up in control memory means 78. This technique allows the number of slots containing address or data information in order for a batch to be considered full to be varied corresponding to the total size of the messages within the memory means.

FIG. 27 shows a second alternate technique for determining threshold value. First, in step 320, the time of day is determined from time of day clock 80. Then in step 322, similar to step 126, the total size of the messages within the memory means excluding the POCSAG buffer is determined. Then in step 324, a time value is looked up in the control memory means 78 corresponding to the time of day. Next, in step 326, a threshold value is calculated to be equal to the time value determined in step 324 plus the total message value determined in step 322 multiplied by a constant 0.01. This technique allows a number of slots containing address and data information in a POCSAG batch in order for the batch to be considered full to be varied as both a function of the time of day and the total size of the messages held within the paging terminal.

Figure 28:
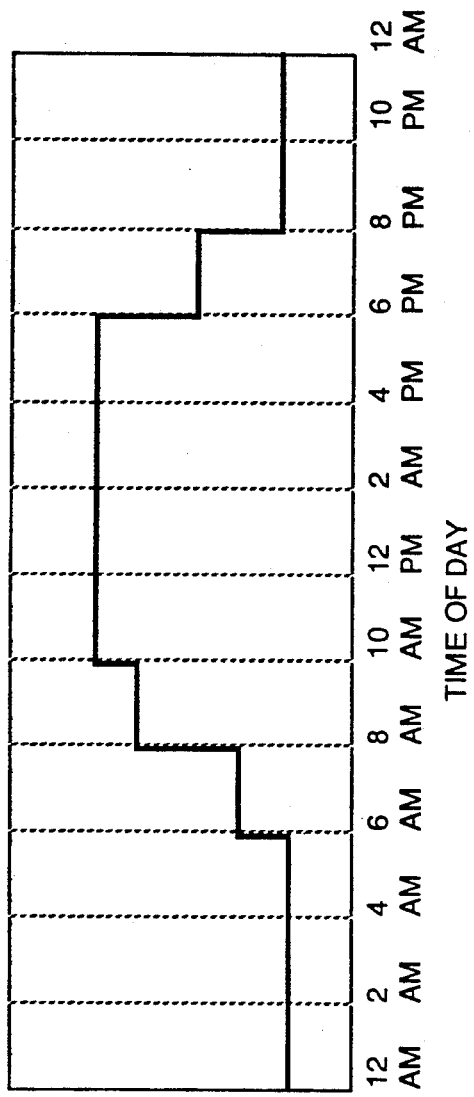
FIG. 28 shows a graphical representation relating the threshold value to the time of day.

FIG. 28 shows a graphical representation of a table within control memory means 78 relating the minimum number of slots with information for a full batch versus time of day. This equates to a threshold value looked up in step 312 and the time value looked up in step 324. Note that during the early morning hours 12:00 A.M. to 6:00 A.M. when the system is usually lightly loaded, the number of slots having address and data information is approximately 6. Thus, a batch may contain a large number of empty or idle code slots in order for the batch to be considered full. As the day progresses, loading gradually increases until peak loading occurs between 10:00 A.M. and 4:00 P.M., wherein the number of slots increases to 12, thereby requiring more information to be included within the packet in order for the packet to be considered full. Then as system loading gradually decreases, the number of slots containing address for data information also gradually decreases to 6 slots.

Figure 29:
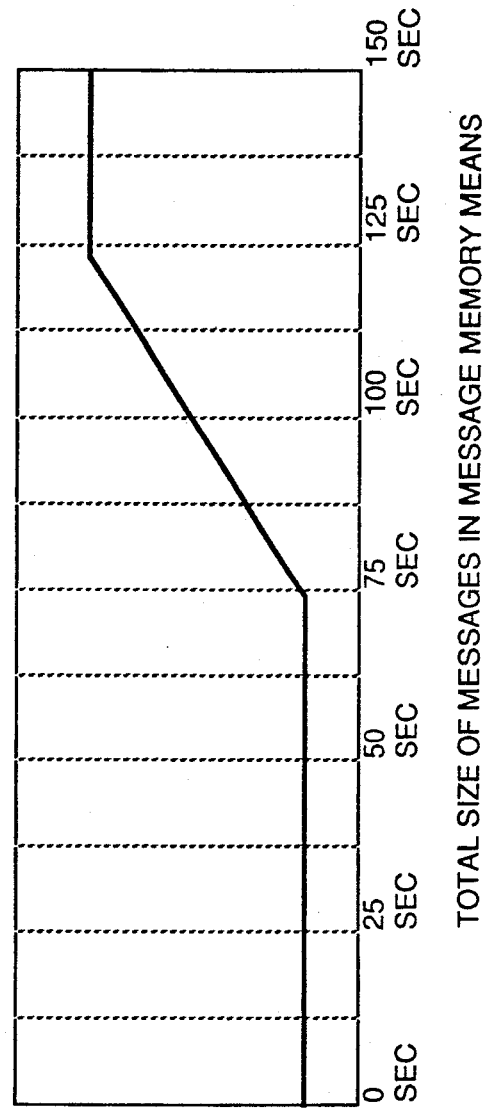
FIG. 29 shows a graphical representation equating the threshold value to the total size of the messages within the message memory means.

FIG. 29 is a graphical representation of a table within control memory means 78 equating the minimum number of slots with information for a full batch versus the total size of messages within the memory means. This equates to the value looked up in step 316. Note that as the total size of messages within the memory means is low or less than 75 seconds, the number of slots having address or data information in order for a batch to be considered full is about 6. However, as the total size of messages in the memory means increases corresponding to an increase in system loading, a minimum number of slots with information for a full batch also increases to 12. After 125 seconds of messages in the message memory means, a constant value of 12 or more slots is required for POCSAG batch to be considered full. The graph of FIG. 29 illustrates that during a lightly loaded system, a POCSAG batch does not have to have as much address or data information to be considered full as during the heavily loaded system.

Note that the determination of the POCSAG protocol size based upon the techniques shown in FIGS. 24–29 allow the determined size of a POCSAG protocol to be varied over the time of day. Particularly note that in FIG. 23, during the heavily channel loaded times, FIGS. 28 of 29 have the minimum number of slots containing address or information within a POCSAG batch to be considered full limited to 12. Using this analysis, the size of the protocol shown in FIG. 23 would be one batch. However, during the lightly loaded times as illustrated by FIGS. 28 or 29, the minimum number of slots within a POCSAG batch having address or information in order for that batch to be considered full is reduced to 6. Upon examining the protocol of FIG. 23 using the flow chart of FIG. 24 with a threshold value of 6 the size of the protocol of FIG. 23 is two batches. Therefore, during the heavily loaded times, the size of the protocol of FIG. 23 is only one batch. However, during lightly loaded channel times, the size of the protocol of FIG. 23 is two batches. This technique allows the information density of a POCSAG type batch to be varied versus channel loading.

In a preferred embodiment of the invention the output of the time of day clock 80 is converted by control means 76 into a four level signal which controls various characteristics or operations of the paging terminal. The programming of the values of the four levels and the times in which the levels are activated may be made by parameter input device 82. The limitation of the clock signal to four levels greatly simplifies the programming, design and implementation of the paging terminal. As can be seen by the charts of FIGS. 8, 16, 21, and 28 and discussions related thereto, that a great number of characteristics may be varied by the time of day and preferably by a four level signal generated as a result of the time of day. These characteristics include varying the tariff charged for each message received, similar to the long distance billing structure used in the telephone industry. Other characteristics include varying the size of an incoming message, inhibiting reception of messages from selected message sources, varying the size or age of messages within a protocol buffer necessary for transmission, or a parameter used to determine to size of messages within a protocol buffer on the basis of the time of day. Alternate embodiments may increase or decrease the number of levels produced in response to the time of day clock.

It can be obvious that the number of alterations to the operation of the present invention may be made without departing from the spirit and scope of the claimed invention. Note the graphical representations of FIGS. 8, 9, 16, 17, 21, 22, 28, and 29 represent one embodiment of the present invention. Other representations may be made to account for various applications of central controllers while still remaining within the scope of the present invention.

What is claimed is:

1. A central controller for receiving, handling and transmitting messages comprising:
    means for receiving an incoming message, the incoming message having a size based upon the amount of time elasped during the reception of the incoming message;
    controlling means for producing a control signal in order to optimize the transmission of the plurality of messages;
    limiting means coupled to the receiving means nd responsive to the control signal for limiting the size of the incoming message to a maximum size in response to the control signal, thereby producing a limited message, wherein the maximum size is varied;
    transmitting means for transmuting the limited message to a plurality of selective call receivers,
    thereby varying the maximum size of messages transmitted to the selective call receivers in order to optimize the transmission of the plurality of messages.

2. A central controller for receiving, handling and transmitting messages comprising:
    means for receiving an incoming message, the incoming message having a size based upon the amount of time necessary to transmit the incoming message;
    controlling means for producing a control signal in order to optimize the transmission of the plurality of messages;
    limiting means coupled to the receiving means and responsive to the control signal for limiting the size of the incoming message to a maximum size in response to the control signal thereby producing a limited message, wherein the maximum size is varied;
    transmitting means for transmitting the limited message to a plurality of selective call receivers,
    thereby varying the maximum size of messages transmitted to the selective call receivers in order to optimize the transmission of the plurality of messages.

3. A central controller for receiving, handling and transmitting messages comprising:
    means for receiving an incoming message, the incoming message having a size, the receiving means having a memory means for holding the incoming message and the size of the incoming message is based upon the amount of memory occupied by the incoming message;
    controlling means for producing a control signal in order to optimize the transmission of the plurality of messages;
    limiting means coupled to the receiving means and responsive to the control signal for limiting the size of the incoming message to a maximum size in response to the control signal, thereby producing a limited message, wherein the maximum size is varied;
    transmitting means for transmitting limited message to a plurality of selective call receivers,
    thereby varying the maximum size of messages transmitted to the selective caller receivers in order to optimize the transmission of the plurality of messages.

4. A central controller for receiving, handling and transmitting messages comprising:
    means for receiving an incoming message, the incoming message having a size;
    controlling means for producing a control signal in order to optimize the transmission of the plurality of messages;
    limiting means coupled to the receiving means and responsive to he control signal for limiting the size of the incoming message to a maximum size in response the control signal, hereby producing a limited message, wherein the maximum size is varied, wherein limiting the size of the incoming message includes truncating the incoming messages;
    transmitting means for transmitting the limited message to a plurality of selective call receivers,
    thereby varying the maximum size of messages transmitted to the selective caller receivers in order to optimize the transmission of the plurality of messages.

5. A central controller for receiving, handling and transmitting messages comprising:
    means for receiving an incoming message, the incoming message having a size;
    controlling means for producing a control signal in order to optimize the transmission of the plurality of messages;
    limiting mean coupled to the receiving means and responsive to the control signal for limiting the size of the incoming message to a maximum size in response to the e control signal, thereby producing a limited message, wherein the maximum size is varied, wherein limiting the size of the incoming message includes selectively removing portions to the incoming message;
    transmitting means for transmitting h the limited message to a plurality of selective call receivers,
    thereby varying the maximum size of messages transmitted to the selective caller receivers in order to optimize the transmission of the plurality of messages.

6. The central controller of claim 5 wherein the incoming message is an audiomessage having silent portions and limiting the size of the message includes removing the silent portions.

7. A central controller for receiving, handling and transmitting messages comprising:

means for receiving an incoming message, the incoming message having a size;

controlling means for producing a control signal in order to optimize the transmission of the plurality of messages;

limiting means coupled to the e receiving means and responsive to he control signal for limiting the size of the incoming message to a maximum sie in response the controls signal, thereby producing a limited message, wherein the maximum size is varied, wherein the incoming message is received from a sending unit and the receiving means communicates the maximum size of the incoming message to the sending unit;

transmitting means for transmitting the limited message to a plurality of selective caller receivers, thereby varying the maximum size f messages transmitted to the selective caller receivers index to optimize the transmission of to the plurality of messages.

8. A central controller for receiving, handling and transmitting messages comprising:

means for receiving an incoming message, the incoming message having a size;

controlling means for producing a control signal in order to optimize the transmission of the plurality of messages;

limiting means coupled oh e receiving and and responsive to he control signal for limiting the size of the incoming message to a maximum size in response to the control signal, thereby producing a limited message, wherein the maximum size is varied;

transmitting means for transmitting limited message to a plurally of selective caller receivers, wherein the incoming message is intend for reception by a particular selective call receiver and the control signal si capable of gearing one of a plurality of maximum size signals, and each of the plurality of the selective caller receivers has a corresponding maximum size signal, wherein the control signal generates a maximum size corresponding to the particular selective call receiver;

thereby varying the maximum size of messages transmitted to the selective caller e receivers in order to optimize the transmission the plurality of messages.

9. A central controller for receiving, handling and transmitting messages comprising:

means for receiving an incoming message, the incoming message having a size;

controlling means for producing a control signal in order to optimize the transmissions the plurally of messages;

limiting means coupled oh e receiving means and responsive to the control signal for limiting the size of the incoming message to a maximum size in response to the control signal, thereby producing a limited message, wherein the maximums size is varied;

transmitting means for transmitting the limited message to a plurality of selective call receivers, thereby varying the maximum size of messages transmitted to the selective call receivers in order to optimize the transmission of the plurality of messages;

a means to generating a time signal indicative to the time of day and day of the week information, thereby varying maximum size of the incoming messages as a function the time of day and the day of the week; and wherein the controlling means generates the control signal as a function to the time signal, thereby varying the maximum size of the incoming message as a function of day.

10. The central controller of claim 9 wherein the time signal further includes date information, thereby varying the maximum size the incoming signal as a function of the time of day and the data.

11. A central controller for receiving, handling and transmitting messages comprising:

means for receiving an incoming messages, the incoming message having a size;

controlling means for producing a control signal in order to optimize the transmission of the plurality of messages;

limiting means coupled to the e receiving means and responsive to the control signal for limiting the size of the incoming message to a maximum size in response to the control signal, thereby producing a limited message, wherein the maximum size is varied;

transmitting means for transmitting the limited message to a plurality of selective call receivers, thereby varying the maximum size of messages transmitted to the selective call receivers in order to optimize the transmission the plurality of messages, wherein the transmitting means transits a plurality of messages and the transmit means includes:

memory mean for holding the plurality of messages wherein the plurality of messages have a total size;

means for generating a size signal indicative to f the total size of the plurality of messages; and wherein the controlling means generates the control signal as a function of the size signal, thereby varying the maximum size of the incoming message as a function of the total size of the plurality of messages held within the storage means.

12. The central controller of claim 11 wherein the total size is based upon the amount of memory occupied by the plurality of messages.

13. The central controller of claim 11 wherein the total size is based upon the transmission time of the plurality of messages.

14. The central controller of claim 11 further comprising:

a means for generating a time of day signal; and wherein the controlling means generates the control signal as a function of the size signal and the time of day signal, thereby varying the size of the incoming messages as a function of the total size of the plurality of messages held within the storage means and the time of day.

15. A central controller for receiving, handling and transmitting messages comprising:

receiving means for receiving a plurality of messages;

memory means coupled to the receiving means for accumulating the plurality of messages, wherein the plurality of messages have a total size;

measuring means coupled to the memory means for generating a total size signal indicative of the total size of the plurality of messages;

time keeping means for generating a time signal indicative of the time of day.

controlling means responsive to the time signal for generating a maximum size signal as a function of the time signal;

analyzing means responsive to the total size signal and the maximum size signal for generating a transmit signal in response to the total size signal being substantially equal to the maximum size signal; and transmitting means coupled to the memory means and responsive to the transmit signal for transmitting the plurality of messages within the memory means in response to the transmit signal, thereby varying the size of the transmission of the plurality of messages by the time of day.

16. The central controller of claim 15 wherein the total size of the plurality of messages within the memory means is based upon the time necessary to transmit the plurality of messages within the memory means.

17. The central controller of claim 15 wherein the total size of the plurality of messages within the memory means is based upon the number of messages within the memory means.

18. The central controller of claim 15 wherein the total size of the plurality of messages within the memory means is based upon the amount of memory occupied by the plurality of messages.

19. The central controller of claim 15 wherein the plurality of messages are transmitted in a batch protocol, wherein the plurality of messages occupy a plurality of batches, each batch having a predetermined number of slots, a slot having either address for message information, and each message having an address portion and a data portion and each message being transmitted within contiguous slots, wherein the address portion of the message may only occur within a predetermined slot within each batch, thereby providing for the possibility of leaving several slots within the plurality of batches vacant of either address or data information, wherein a batch is considered full when the number of slots having address for data information within the batch is greater than a threshold signal and the measuring means determines the size of the plurality of messages based upon the number of full batches.

20. The central controller of claim 18 wherein the controlling means additionally generates the threshold signal as a function of the time of day, and the measuring means being coupled to the controlling means responds to the threshold signal for determining when a batch is full batch, thereby varying the number of vacant slots within a full batch by the time of day.

21. A central controller for receiving, handling, and transmitting message comprising:

receiving means for receiving a plurality of messages;

memory means coupled to the receiving means for accumulating the plurality of messages, wherein the plurality of messages have an age indicative of the time elapsed while the messages are within the memory means;

determining means coupled to the memory means for determining the age of the messages within the memory means and for generating a message age signal in response thereof;

time keeping means for generating a time signal indicative of the time of day;

controlling means responsive to the time signal for generating a maximum age signal as a function of the time signal;

analyzing means responsive to the message age signal and the maximum age signal for generating a transmit signal in response to the message age signal being substantially equal to the maximum age signal; and transmitting means coupled to the memory means and responsive to the transmit signal for transmitting the plurality of messages within the memory means in response to the transmit signal, thereby varying the maximum age of the messages within the memory means prior to transmission by the time of day.

22. The central controller of claim 21 wherein the messages within the memory means have a total size and the central controller further comprises:

measuring means coupled to the memory means for generating a total size signal indicative of the total size of the plurality of messages; and wherein the controlling means additionally generates a maximum size signal as a function of the time signal; and the analyzing means being additionally responsive to the total size signal, and the maximum size signal generates a transmit signal in response to the total size signal being substantially equal to the maximum size of the message age signal being substantially equal to the maximum age signal, thereby transmitting the messages within the memory means either when the maximum size for maximum age is substantially realized, and varying the maximum size and the maximum age as a function of the time of day.

23. The central controller of claim 21 wherein the age of the message within the memory represents the age of the oldest message within the memory means, and the age signal generated by the determining means is indicative of the age of the oldest message.

24. The central controller of claim 21 wherein the age of the messages within the memory is the average age of the messages within the memory means, and the age signal generated by the determining means is indicative of the average message age.

25. A central controller for receiving, handling, and transmitting messages comprising:

receiving means for receiving a message, the message being intended for reception by a selective call receiver, the selective call receiver being capable of receiving a message on a predetermined protocol;

selecting means responsive to the message for selecting a message protocol from a plurality of message protocols, wherein the selected message protocol corresponds to the reception protocol of the selective call receiver;

memory means coupled to the receiving means responsive to the selected message protocol and having a plurality of buffers, wherein each buffer stores a plurality of messages of a like message protocol, wherein the memory means stores the message in a buffer corresponding to the selected message protocol and messages stored within the buffer have a size and the messages within the plurality of buffers have a total size;

measuring means coupled to the receiving means determining the size of the message within the buffer and for generating a buffer size signal in response thereof and for determining the total size of the messages within the plurality of buffers and for generating a total size in response thereof;

controlling means responsive to the total size signal for generating a maximum buffer size signal as a function of the total size signal;

analyzing means responsive to the buffer size signal and the maximum buffer size signal for producing the buffer transmit signal in response to the buffer size signal being substantially equal to the maximum buffer size signal; and transmitting means coupled to the memory means and responsive to the buffer transmit signal for transmitting the messages within the buffer in response to the buffer transmit signal, thereby varying the size of the transmission of the messages stored within the buffer as a function of the total size of the messages within the memory means.

26. The central controller of claim 25 further comprising:

time keeping means for generating a time signal indicative of the time of day; and wherein the controlling means being additionally responsive to the time signal generates the maximum buffer size signal as a function of the total size signal and the time signal, thereby varying the size of the transmission of the messages accumulated within the buffer as a function of the total size of the messages within the memory means and the time of day.

27. The central controller of claim 25 further wherein:

the messages within the plurality of batches exclusive of the batch have an intermediate size;

the measuring means additionally determines the intermediate size and generates an intermediate size signal;

the controlling means additionally responsive to the intermediate's size signal generates a threshold signal in response thereof; and the messages stored within the buffer are transmitted in a batch protocol wherein the messages occupy a plurality of batches and each batch as a predetermined number of slots, a slot having either address for message information, and a message having an address portion and a data portion and the message being transmitted within contiguous slots, wherein the address portion of the message may only occur within a predetermined slot within each batch, thereby providing for the possibility of leaving several slots within the plurality of batches vacant of either address for data information, wherein a batch is considered full when the number of vacant slots within the batch is less than a threshold signal and the measuring means determines the size of the plurality of messages as a function of the number of full batches.

28. A central controller for receiving, handling, and transmitting messages comprising:

receiving means for receiving a message, the message being intended for reception by a selective call receiver, the selective call receiving being capable of receiving the message on a predetermined protocol;

selecting means responsive to the message for selecting a message protocol from a plurality of message protocols for the message, wherein the selected message protocol corresponds to the reception protocol of the selective call receiver;

memory means coupled to the receiving means, responsive to the selected message protocol and having a plurality of buffers, wherein each buffer stores a plurality of messages of like message protocol, wherein the memory means stores the message in a buffer corresponding to the selected message protocol and message stored within the buffer have an age indicative of the time elapsed while the messages are within the buffer and further wherein the message within the plurality of buffers have a total size;

determining means coupled to the memory means for determining the age of the messages within the buffer and for generating a buffer age signal in response thereof;

measuring means coupled to the memory means for determining the total size of the messages within the memory means and for generating a total size signal in response thereof;

controlling means responsive to the total size signal for generating a maximum buffer age signal as a function of the total size signal;

analyzing means responsive to the buffer age signal and the maximum buffer age signal for producing the buffer transmit signal in response to the buffer age signal being substantially equal to the maximum buffer age signal; and transmitting means coupled to the memory means and responsive to the buffer transmit signal for transmitting the messages within the buffer in response to the buffer transmit signal, thereby varying the maximum age of messages are stored within the buffer prior to transmission as a function of the total size of the messages within the memory means.

29. The central controller of claim 28 further wherein:

the messages within the buffer have a size;

the measuring means additionally determines the size of the messages within the buffer and generates a buffer size signal in response thereof;

the controlling means additionally generates a maximum buffer size signal; and the analyzing means being addition responsive to the buffer size signal and the maximum buffers size signal and generates the buffer transmit signal in response to the buffer size signal being substantially equal to the maximum buffer size signal, thereby transmitting the messages within the buffer when the maximum buffer size is substantially realized, for when the maximum time has elapsed, whichever occurs first, and varying the maximum time and maximum size as a function of the total size of the message within the memory means.

30. The central controller of claim 29 wherein the controlling means is responsive to the total size signal and the maximum buffer size signal is generated in response to the total size signal.

31. The central controller of claim 29 wherein the maximum buffer size signal is determined.

32. The central controller of claim 28 wherein the maximum age signal is the product of the total size and the optimization value.

33. The central controller of claim 32 wherein the optimization parameter is predetermined.

34. The central controller of claim 32 further comprising:
  time keeping means for generating a time signal indicative of the time of day; and wherein
  the controlling means being additionally responsive to the time signal generates the optimization parameter as a function of the time of day.

35. The central controller of claim 32 further comprising a means for manually varying the optimization parameter.

* * * * *